United States Patent
Iida et al.

(10) Patent No.: US 8,689,293 B2
(45) Date of Patent: Apr. 1, 2014

(54) ACCESS CONTROL DEVICE, ACCESS CONTROL METHOD, PROGRAM, STORAGE MEDIUM, AND INTEGRATED CIRCUIT

(75) Inventors: Hiromi Iida, Osaka (JP); Shohji Ohtsubo, Osaka (JP); Naohisa Tanabe, Osaka (JP)

(73) Assignee: Panasonic Corporation, Osaka (JP)

( * ) Notice: Subject to any disclaimer, the term of this patent is extended or adjusted under 35 U.S.C. 154(b) by 306 days.

(21) Appl. No.: 13/148,734

(22) PCT Filed: Jul. 13, 2010

(86) PCT No.: PCT/JP2010/004537
§ 371 (c)(1),
(2), (4) Date: Aug. 10, 2011

(87) PCT Pub. No.: WO2011/007554
PCT Pub. Date: Jan. 20, 2011

(65) Prior Publication Data
US 2011/0321137 A1    Dec. 29, 2011

(30) Foreign Application Priority Data
Jul. 16, 2009   (JP) .................. 2009-167399

(51) Int. Cl.
*H04L 29/06*    (2006.01)

(52) U.S. Cl.
USPC ................................................ 726/4; 726/28

(58) Field of Classification Search
USPC ........................................................ 726/4, 28
See application file for complete search history.

(56) References Cited

U.S. PATENT DOCUMENTS

| 6,754,665 B1 | 6/2004 | Futagami et al. |
| 7,558,408 B1 | 7/2009 | Steinberg et al. |
| 2002/0007311 A1 | 1/2002 | Iseki et al. |

(Continued)

FOREIGN PATENT DOCUMENTS

JP    2001-5833    1/2001

(Continued)

OTHER PUBLICATIONS

International Search Report issued Sep. 28, 2010 in International (PCT) Application No. PCT/JP2010/004537.
Extended European Search Report mailed Aug. 29, 2013 in corresponding European Application No. EP 10799618.3.

*Primary Examiner* — Jeffrey Pwu
*Assistant Examiner* — Thong Truong
(74) *Attorney, Agent, or Firm* — Wenderoth, Lind & Ponack, L.L.P.

(57) ABSTRACT

An access control device for use in a system for providing users with a content access service, the access control device obtaining a content including one or more pieces of personal information, storing a plurality of pieces of personal information in correspondence with a plurality of pieces of first user information each of which indicates one of (i) a user who is permitted by a person related to a corresponding piece of personal information to access a content including the corresponding piece of personal information, and (ii) a user who is not permitted by the person related to the corresponding piece of personal information to access the content, and determining whether or not to give permission to access the content obtained by the obtaining unit, in accordance with a piece of first user information stored in the storage unit in correspondence with the piece of personal information included in the content.

13 Claims, 22 Drawing Sheets

(56) References Cited

U.S. PATENT DOCUMENTS

2008/0109307 A1*  5/2008  Ullah .............................. 705/14
2009/0010570 A1   1/2009  Yamada et al.
2009/0016645 A1   1/2009  Sako et al.
2009/0324137 A1* 12/2009  Stallings et al. ............. 382/306

FOREIGN PATENT DOCUMENTS

| | | |
|---|---|---|
| JP | 2001-325259 | 11/2001 |
| JP | 2003-32616 | 1/2003 |
| JP | 2006-146426 | 6/2006 |
| WO | 2009/082814 | 7/2009 |

* cited by examiner

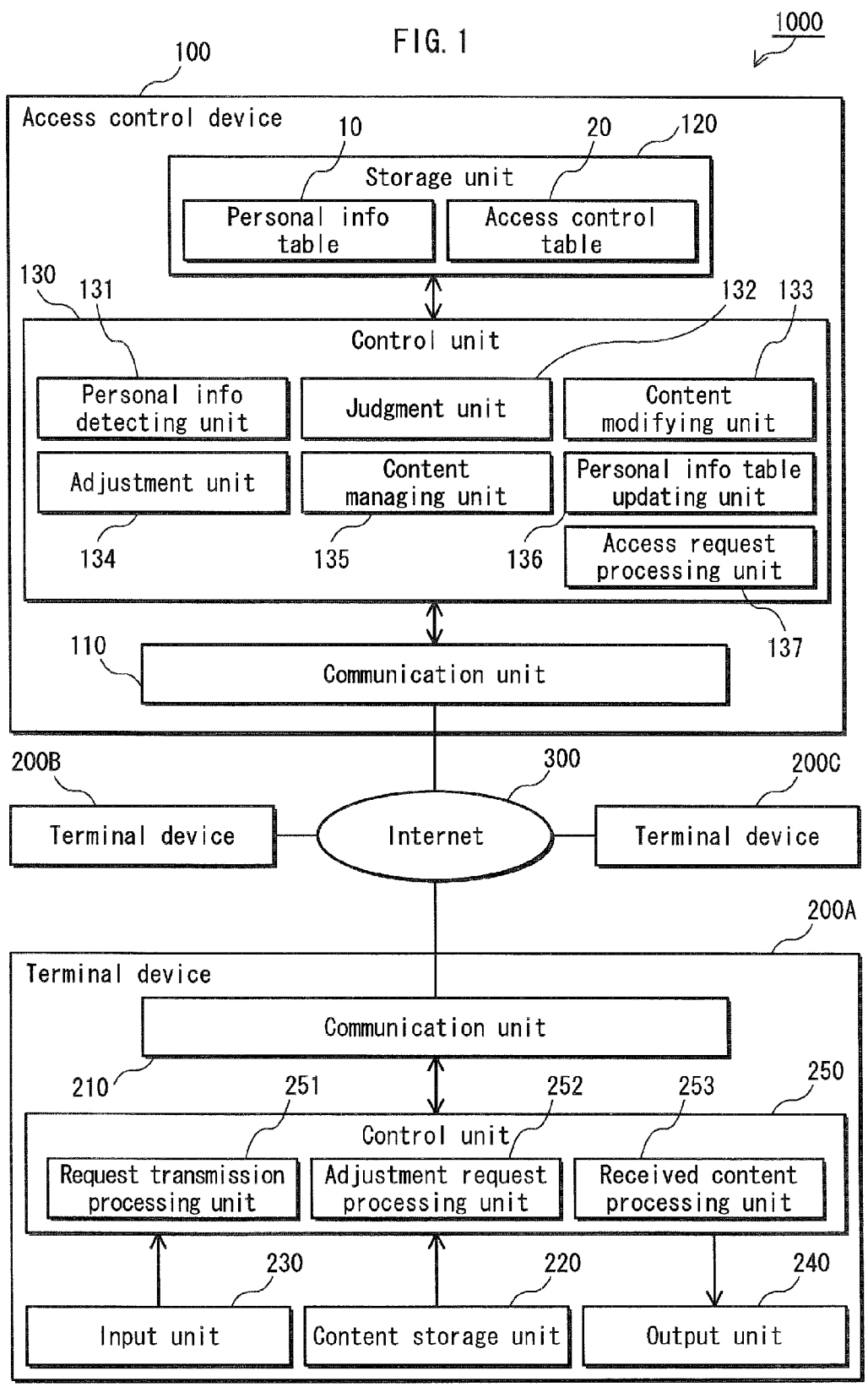

FIG. 2A
Personal info table 10

| User ID | User name | Facial data | Email address | First user info |
|---|---|---|---|---|
| U0001 | Mary A Mount | Facial data A | a○a@aaa.com | U0001, U0002 |
| U0002 | John B River | Facial data B | b×b@bbb.com | U0002, U0004 |
| U0003 | Mary C Wood | Facial data C | c△c@ccc.com | U0001, U0002, U0003, U0004 |
| U0004 | John D Marine | Facial data D | d◇d@ddd.com | U0001, U0002, U0004 |
| ... | | | | |

FIG. 2B
Access control table 20

| Content ID | Personal info owner info | Permitted user info |
|---|---|---|
| C0001 | U0001 | U0001, U0002 |
| C0002 | U0002, U0003 | U0002, U0004 |
| C0003 | U0001, U0003, U0004 | U0001, U0002 |
| C0004 | U0001, U0003 | U0001, U0002 |
| ... | | |

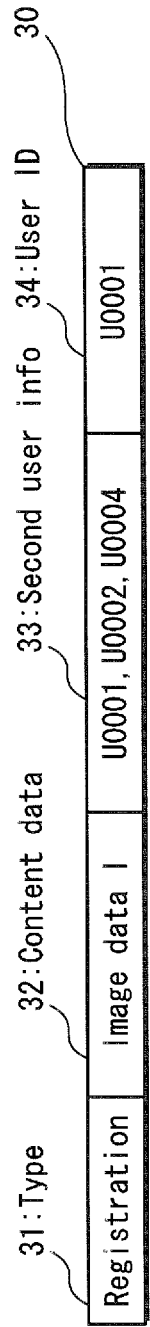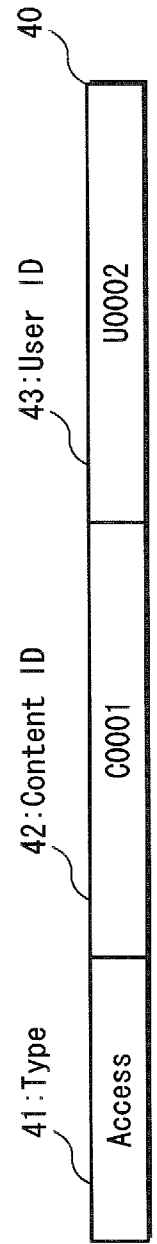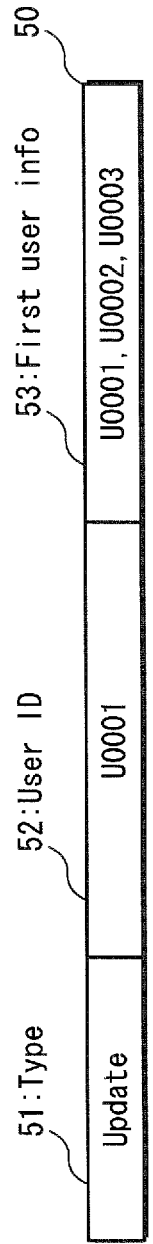
FIG. 3A Content registration request
FIG. 3B Content access request
FIG. 3C First user info update request FIG. 9A
Personal info table

| User ID | User name | Facial data | Email address | First user info |
|---|---|---|---|---|
| U0001 | Mary A Mount | Facial data A | a○a@aaa.com | U0001, U0002 |
| U0002 | John B River | Facial data B | b×b@bbb.com | U0001, U0002, U0003, U0004 |
| U0003 | Mary C Wood | Facial data C | c△c@ccc.com | U0001, U0002, U0003, U0004 |
| U0004 | John D Marine | Facial data D | d◇d@ddd.com | U0001, U0002, U0004 |
| ... | ... | ... | ... | ... |

FIG. 9B
Access control table

| Content ID | Personal info owner info | Permitted user info |
|---|---|---|
| C0001 | U0001 | U0001, U0002 |
| C0002 | U0002, U0003 | U0002, U0004 |
| C0003 | U0001, U0003, U0004 | U0001, U0002 |
| C0004 | U0001, U0003 | U0001, U0002 |
| ... | ... | ... |
| C1001 | U0001, U0002, U0003, U0004 | U0001, U0002 |

FIG. 10A

Adjustment request

| Destination | a○a@aaa.com |
|---|---|
| Subject | Adjustment request (C1001) |
| Attachment | C1001.gif |

Dear Ms. Mount:

Please be notified that Ms. Mary C Wood wishes you to give permission to the following users to access the content including your personal information (see the attachment).

"Mary C Wood"
"John D Marine"

If you do not agree with permitting the users to access the content, please type "0", and if you agree, type "1", as the body of the message and return the email.

Response indicating that user agrees with permitting out-of-range users to access content

| Destination | xxx@xxx.com |
|---|---|
| Subject | Re:Adjustment request (C1001) |

Response indicating that user does not agree with permitting out-of-range users to access content

| Destination | xxx@xxx.com |
|---|---|
| Subject | Re:Adjustment request (C1001) |

Content registration notification

| Destination | aOa@aaa.com |
|---|---|
| Subject | Content registration notification ( C1001 ) |

Dear Ms. Mount:

Please be notified that a content which you are given permission to access by Ms. Mary C Wood was registered.

When you transmit a request to access the content, please specify the following content ID.

Content provisional registration notification

| Destination | aOa@aaa.com |
|---|---|
| Subject | Content provisional registration notification ( C1001 ) |

Dear Ms. Mount:

Please be notified that a content which you are given permission to access by Ms. Mary C Wood was provisionally registered.

When you transmit a request to access the content, please specify the following content ID.

Access control table

| Content ID | Personal info owner info | Second user info | Permitted user info |
|---|---|---|---|
| C0001 | U0001 | U0001, U0002, U0003 | U0001, U0002 |
| C0002 | U0002, U0003 | U0001, U0002, U0003, U0004 | U0002, U0004 |
| C0003 | U0001, U0003, U0004 | U0001, U0002 | U0001, U0002 |
| C0004 | U0001, U0003 | U0001, U0002, U0003 | U0001, U0002 |
| ... | ... | ... | ... |

FIG. 17A
Access control table

| Content ID 21 | Personal info owner info 22 | First user info 71 | Second user info 61 | Permitted user info 23 |
|---|---|---|---|---|
| ... | ... | ... | ... | ... |
| C0004 | U0001 | U0001, U0002 | | |
| | U0003 | U0001, U0002, U0003, U0004 | U0001, U0002, U0003 | U0001, U0002 |
| C0005 | U0001 | U0001, U0002, U0003 | U0001, U0002, U0003 | U0001, U0002, U0003 |
| | U0002 | U0001, U0002, U0003, U0004 | | |
| ... | ... | ... | ... | ... |

FIG. 17B
First user info update request

| 51:Type | 56:Content ID | 52:User ID | 53:First user info 55 |
|---|---|---|---|
| Update | C0004 | U0001 | U0001, U0002, U0003 |

FIG. 22A  Adjustment request

| Destination | aOa@aaa.com |
| Subject | Adjustment request ( C1001 ) |
| Attachment | C1001.gif |

Dear Ms. Mount:

Please be notified that Ms. Mary C Wood wishes you to give permission to the following users to access the content including your personal information (see the attachment).

" Mary C Wood "
" John D Marine "

If you agree with permitting the users to access all the contents, please type "1", if you agree with permitting the users to access only the attached content, type "2", and if you do not agree with permitting the users to access any of the contents, type "0", as the body of the message, and return the email.

FIG. 22B  Response indicating that user agrees with permitting out-of-range users to access only registration target content

| Destination | xxx@xxx.com |
| Subject | Re:Adjustment request ( C1001 ) — M9 |

2  — M10

ACCESS CONTROL DEVICE, ACCESS CONTROL METHOD, PROGRAM, STORAGE MEDIUM, AND INTEGRATED CIRCUIT

TECHNICAL FIELD

The present invention relates to a technology for controlling accesses to contents such as image data.

BACKGROUND ART

There is known a technology where, in a content management system for managing contents in a server on the Internet, a user can set whether or not to permit another user to access a content when the user registers the content (for example, Patent Literature 1).

Also there has conventionally been known a method for setting an access right so that only particular users are permitted to access a file.

That is to say, according to these conventional technologies, when a user registers, in a server, a content owned by the user, the user can set an access right so that only particular users, whom the user desires to give permission to access the content, are permitted to access the content.

CITATION LIST

Patent Literature

[Patent Literature 1] Japanese Patent Publication No. 2001-325259

SUMMARY OF INVENTION

Technical Problem

Meanwhile, a content may include information related to a person (hereinafter such information is referred to as "personal information"). Some examples of such personal information include face image data of a subject contained in still image data (hereinafter referred to as "image data") or AV (Audio Visual) data (hereinafter referred to as "video data"), and data of voice of a subject contained in video data.

According to the above conventional technologies, a range of users who are permitted to access a registered content are determined by a user who registers the content, and an access control on the registered content is performed based on the result of the determination.

However, in the determination of the users who are permitted to access a content, the intention of persons whose personal information are included in the content (hereinafter the persons are also referred to as "owners of personal information") is not reflected. Thus there is a possibility that an access to a content may be permitted to a person whom an owner of personal information does not desire to give permission to access the content.

It is therefore an object of the present invention to provide an access control device that can perform a control on whether or not to permit an access to a content, reflecting intention of owners of personal information included in the content.

Solution to Problem

The above object is fulfilled by an access control device for use in a system for providing users with a content access service, the access control device comprising: an obtaining unit operable to obtain a content including one or more pieces of personal information; a storage unit storing a plurality of pieces of personal information in correspondence with a plurality of pieces of first user information each of which indicates one of (i) a user who is permitted by a person related to a corresponding piece of personal information to access a content including the corresponding piece of personal information, and (ii) a user who is not permitted by the person related to the corresponding piece of personal information to access the content; and a control unit operable to determine whether or not to give permission to access the content obtained by the obtaining unit, in accordance with a piece of first user information stored in the storage unit in correspondence with the piece of personal information included in the content.

Advantageous Effects of Invention

With the above structure of the access control device of the present invention, it is possible perform a control on whether or not to permit an access to a content, reflecting intention of owners of personal information included in the content.

BRIEF DESCRIPTION OF DRAWINGS

FIG. 1 illustrates a system structure of the access control system 1000 in Embodiment 1.

FIGS. 2A and 2B illustrate the data structures and examples of contents of the personal information table 10 and the access control table 20.

FIGS. 3A through 3C illustrate the data structures and examples of contents of the content registration request 30, content access request 40, and first user information update request 50.

FIGS. 9A and 9B illustrate examples of contents of the personal information table 10 and the access control table 20 after the image data 1 is registered.

FIGS. 10A through 10C illustrate examples of the adjustment request and responses to the adjustment request in Embodiment 1.

FIGS. 11A and 11B illustrate examples of the content registration notification and the content provisional registration notification.

FIG. 12 illustrates the data structure and examples of contents of an access control table 60 in Modification.

FIGS. 17A and 17B illustrate the data structures and examples of contents of the access control table 70 and the first user information update request 55 in Embodiment 2.

FIGS. 22A and 22B illustrate examples of the adjustment request and responses to the adjustment request in Embodiment 2.

DESCRIPTION OF EMBODIMENTS

Figure 4:
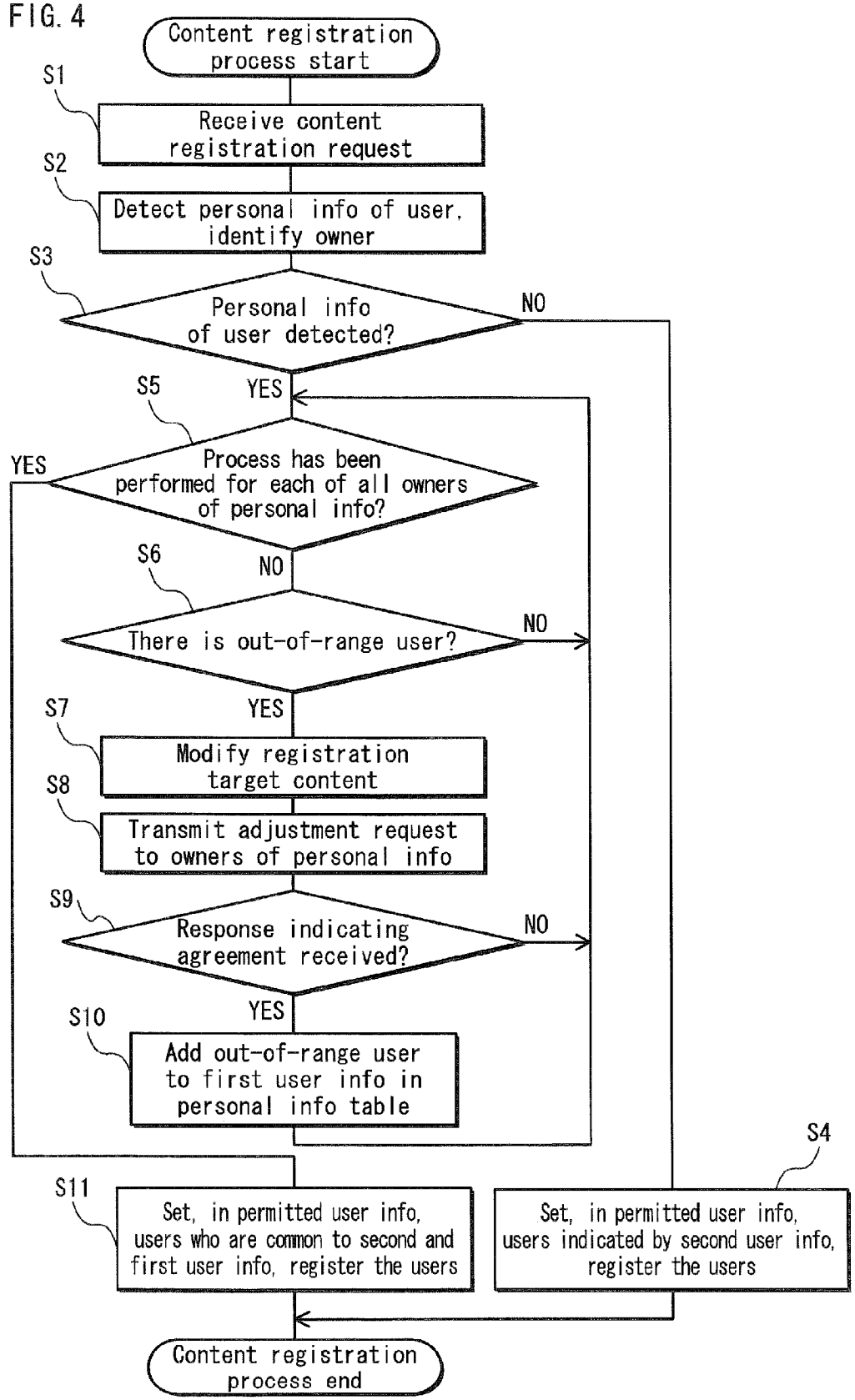
FIG. 4 is a flowchart showing the procedure of the content registration process in Embodiment 1.

The following describes embodiments of an access control system including an access control device of the present invention, with reference to the drawings.

<<Embodiment 1>>

<Structure>

The structure of an access control system 1000 in Embodiment 1 will be described.

<Access Control System>

FIG. 1 illustrates a system structure of the access control system 1000 in Embodiment 1.

The access control system 1000 includes an access control device 100 and terminal devices 200A, 200B and 200C, wherein these devices are interconnected via an Internet 300.

Note that, although three terminal devices (200A, 200B and 200C) are illustrated in the drawing as one example, the number of terminal devices included in the access control system 1000 is not limited to "3", but may be any number such as "100" or "10000" as far as the number is higher than "1".

Here, the access control device 100 has a function to, upon receiving a content registration request from a terminal device via the Internet 300, make an adjustment to determine one or more users who are permitted to access the content, and register the content.

This adjustment is made based on a range of users whom the user of the terminal device that transmitted the content registration request desires to give permission to access the content, and a range of users whom one or more owners of personal information included in the content permit to access the content, so that users who are finally permitted to access the content do not exceed the range of users whom the owners of personal information permit to access the content. With such an adjustment, it is possible to prevent any users, whom the owners of personal information included in the content do not desire to give permission to access the content, from being permitted to access the content.

The terminal devices (200A, 200B and 200C) are, for example, personal computers (that have displays) used by respective users of the access control system 1000.

Each of the terminal devices has a function to transmit various requests based on user operations. More specifically, each terminal device transmits a registration request, access request or the like, wherein, with the registration request, a user requests a content, which the user desires to share with other users, to be registered in the access control device 100, and with the access request, a user requests to access a predetermined content having been registered by another user in the access control device 100.

In the following, the access control device 100 and each terminal device will be described with reference to FIG. 1. Since the terminal devices have similar structures, the following describes only the terminal device 200A.

<Access Control Device>

First, the structure of the access control device 100 will be described.

As shown in FIG. 1, the access control device 100 includes a communication unit 110, a storage unit 120, and a control unit 130. The access control device 100 also includes a memory and a processor that are not illustrated, and a function of the control unit 130 is achieved when the processor executes a program stored in the memory.

The communication unit 110 has a function to transmit and receive data to/from each of the terminal devices (200A, 200B and 200C) via the Internet 300.

Also, the storage unit 120 is a memory area storing a personal information table 10 and an access control table 20, as well as various types of contents (image data, video data, text data and the like) that have been, although not illustrated, registered based on content registration requests from the terminal devices. The storage unit 120 is realized by a hard disk or the like.

The personal information table 10 is a table in which are registered, for each user of the access control system 1000, personal information of the user and information (hereinafter referred to as "first user information") indicating one or more users whom the user permits to access the contents that include the personal information of the user.

The access control table 20 is a table having information (hereinafter referred to as "permitted user information") that indicates, for each registered content, one or more users who are actually permitted to access the content.

These tables will be explained in detail below (see FIGS. 2A and 2B).

The control unit 130 controls the entire device and has a function to execute processes depending on various types of requests transmitted from terminal devices. The control unit 130 includes a personal information detecting unit 131, a judgment unit 132, a content modifying unit 133, an adjustment unit 134, a content managing unit 135, a personal information table updating unit 136, and an access request processing unit 137.

The personal information detecting unit 131 has a function to, upon receiving a content registration request from a terminal device (200A, 200B or 200C) via the communication unit 110, refer to the personal information table 10 and detect personal information included in a content that is the target of the received content registration request, the personal information being those of one or more users of the access control system 1000.

It should be noted here that, although will be described below in detail, a content registration request includes information (hereinafter referred to as "second user information") that indicates one or more users of the access control system 1000 whom a user of the terminal device that has transmitted the content registration request desires to give permission to access the content that is to be registered by the content registration request (see FIG. 3A).

The judgment unit 132 has a function to judge, for each piece of personal information detected by the personal information detecting unit 131, whether or not there is a user (hereinafter referred to as an "out-of-range user") who is not included in the one or more users indicated by the piece of first user information as being permitted by the users related to the personal information (the owners of the personal information) to access a content, but is included in the one or more users indicated by the second user information.

That is to say, the out-of-range user is one of one or more users who are desired to be permitted to access a content by a user who is registering the content (hereinafter also referred to as an "owner of the content"), but is not included in the one or more users who are permitted to access the content by the one or more owners of the personal information included in the content.

The content modifying unit 133 has a function to modify a content so that one or more users cannot be identified from the personal information of the users included in the content, except for particular users.

The adjustment unit 134 has a function to, if the judgment unit 132 judges that there is an out-of-range user, send a request for each owner of the personal information related to the judgment to return a response indicating if he/she permits the out-of-range user to access the content that includes the personal information in concern.

Note that in the present embodiment, these requests and responses are sent via email. Furthermore, the above request is also referred to as an "adjustment request".

The adjustment unit 134 transmits an adjustment request which includes a content, wherein the content has been modified by the content modifying unit 133 so that one or more persons cannot be identified from the personal information of the persons (owners of the personal information) included in the content, except for the owner of personal information to whom the adjustment request is sent.

The content managing unit 135 has a function to store a content into the storage unit 120 depending on the content registration request. In particular, the content managing unit 135 has a function to register permitted user information in the access control table 20 depending on a response to an adjustment request transmitted from the adjustment unit 134.

The personal information table updating unit 136 has a function to, if a response to an adjustment request transmitted from the adjustment unit 134 is affirmative, update the first user information in the personal information table 10 at a portion associated with a user (an owner of personal information) who transmitted the response so that the first user information includes the out-of-range user.

Also, the personal information table updating unit 136 has a function to, upon receiving a first user information update request, which will be described below, from a terminal device via the communication unit 110, update the first user information in the personal information table 10 at a portion associated with a user (an owner of personal information) who transmitted the update request.

The access request processing unit 137 has a function to, upon receiving a content access request from a terminal device via the communication unit 110, perform a control on whether or not to transmit a content specified in the request and stored in the storage unit 120, or a content having been modified by the content modifying unit 133, to the terminal device which is the transmission source of the content access request, via the communication unit 110.

<Terminal Device>

Next, the structure of the terminal device 200A will be described.

The terminal device 200A, as shown in FIG. 1, includes a communication unit 210, a content storage unit 220, an input unit 230, an output unit 240, and a control unit 250. The terminal device 200A includes a memory and a processor that are not illustrated. A function of the control unit 250 is achieved when the processor executes a program stored in the memory.

The communication unit 210 has a function to transmit and receive data to/from the access control device 100 via the Internet 300.

The content storage unit 220 is a memory area which is used by the owner of the terminal device 200A to store contents, and is realized by a hard disk or the like.

Note that it is presumed here that a content (owned by another user) obtained from the access control device 100 is not stored in the content storage unit 220, but is stored in the memory under the control of the control unit 250.

The input unit 230 is an input device such as a keyboard or a mouse, and has a function to transfer an input signal corresponding to a key or button pressed by the user, to the control unit 250. The output unit 240 is an output device such as an LCD (Liquid Crystal Display) or a speaker, and has a function to display a character or the like or output a sound/voice or the like depending on an instruction from the control unit 250.

The control unit 250 controls the entire device, and has a function to transmit, to the access control device 100, various requests and responses to the adjustment request received from the access control device 100, based on the contents of input signals transferred from the input unit 230. The control unit 250 also has a function to output a content received from the access control device 100, to the output unit 240.

The control unit 250 includes a request transmission processing unit 251, an adjustment request processing unit 252, and a received content processing unit 253.

The request transmission processing unit 251 has a function to generate a request, namely, (i) a content registration request, (ii) a content access request, or (iii) a first user information update request, depending on the contents of an input signal transferred from the input unit 230, and transmit the generated request to the access control device 100 via the communication unit 210.

The adjustment request processing unit 252 has a function to generate a response to an adjustment request, which is received from the access control device 100 via the communication unit 210, based on the contents of an input signal transferred from the input unit 230, and transmit the generated response to the access control device 100 via the communication unit 210.

Here, since the adjustment request and the response thereto are sent via email, the adjustment request processing unit 252 has a function to transmit/receive an email.

The received content processing unit 253 has a function to perform an output process for outputting data to the output unit 240 depending on the type of a content received from the access control device 100 via the communication unit 210. For example, the received content processing unit 253 displays an image or a character on the LCD when the received content is image data or text data, and displays an image on the LCD and outputs a sound/voice from the speaker when the received content is video data.

<Data>

The following describes data used in the access control system 1000.

<Personal Information Table>

FIG. 2A illustrates the data structure and examples of contents of the personal information table 10.

The personal information table 10 is information composed of a user ID 11, a user name 12, facial data 13, an email address 14, and first user information 15, which are stored in the personal information table 10 in association with each user of the access control system 1000.

Note that in the following, a piece of information composed of the user ID 11, the user name 12, the facial data 13, the email address 14, and the first user information 15 is also referred to as a "record".

The personal information table 10 is referenced by the personal information detecting unit 131 to detect personal information contained in a content that is a target of a registration request, or is referenced by the judgment unit 132 to judge whether or not there is an out-of-range user.

Also, a record having been registered in the personal information table 10 is updated by the personal information table updating unit 136 depending on the contents of a response to an adjustment request, or depending on a first user information update request. Furthermore, a registration of a new record in the personal information table 10 or a deletion of a registered record is performed by a manager of the access control device 100 via an input device (not illustrated) such as a keyboard or a mouse provided in the access control device 100 when, for example, the number of users of the access control device 100 has increased or decreased.

The user ID 11 is identification information of an associated user, and is text-format data. The user name 12 is text-format data indicating a name of the associated user. The facial data 13 is a group of image characteristics parameters extracted, for identification of the associated user, from image data (which is, for example, JPEG data, JPEG standing for Joint Photographic Experts Group) which is generated by photographing the face of the associated user. The facial data A through D shown in FIG. 2A are presumed to represent concrete examples of groups of image characteristics parameters.

Upon receiving image data generated by photographing the face of a user, the manager of the access control device 100 causes the control unit 130 of the access control device 100 to extract the group of image characteristics parameters (facial data), and registers the facial data. Note that the device caused to extract the group of image characteristics parameters (facial data) is not limited to the access control device 100, but may be a different device.

The email address 14 is text-format data indicating an email address of an associated user.

Each of the user ID 11, the user name 12, the facial data 13, and the email address 14 is personal information because it can identify a person by itself or by cross-checking with other information in the personal information table 10.

The first user information 15 is information indicating one or more users who are permitted by an associated user to access the personal information of the associated user, namely, to access contents which include at least one of associated user ID, user name, facial data, and email address.

FIG. 2A shows that, for example, a user who is identified by user ID "U0001" has a user name "Mary A Mount", facial data "facial data A", email address "a∘a@aaa.com", and first user information "U0001, U0002", which indicates that the users whom user "Mary A Mount" permits to access the personal information of her are "Mary A Mount" (namely, the user herself) and "John B River".

<Access Control Table>

FIG. 2B illustrates the data structure and examples of contents of the access control table 20.

The access control table 20 is information composed of one or more sets of a content ID 21, personal information owner information 22, and permitted user information 23, each set being associated with a different one of contents registered in the access control device 100.

Note that in the following, a piece of information composed of the content ID 21, the personal information owner information 22, and the permitted user information 23 is also referred to as a "record".

The access control table 20 is referenced when the access request processing unit 137 has received a content access request from a terminal device. Also, a new record is registered in the access control table 20 when the content managing unit 135 has received a content registration request from a terminal device.

The content ID 21 is identification information of an associated content. The personal information owner information 22 is identification information of one or more owners of personal information contained in an associated content, and each piece of personal information owner information 22 matches any of the user IDs stored in the personal information table 10.

The permitted user information 23 is identification information of one or more users permitted to access an associated content, and each piece of permitted user information 23 matches any of the user IDs stored in the personal information table 10.

FIG. 2B shows, for example, the following: a content identified by content ID "C0001" includes personal information which is owned by a user indicated as "U0001" (namely, Mary A Mount) by the personal information owner information. Also, permitted users are indicated as "U0001" (namely, Mary A Mount) and "U0002" (namely, John B River) by the permitted user information. That is to say, it indicates that the content includes personal information of "Mary A Mount", and that "Mary A Mount" and "John B River" are permitted to access the content.

<Content Registration Request>

FIG. 3A illustrates the data structure and examples of contents of a content registration request 30.

The content registration request 30 is a command transmitted from a terminal device to the access control device 100 by an owner of a content when the owner registers the content in the access control device 100.

As shown in FIG. 3A, the content registration request 30 includes a type 31, content data 32, second user information 33, and a user ID 34.

The type 31 is information indicating a type of a request. In this example, a request in which "registration" has been set in the type 31 is a content registration request.

The content data 32 is content data that is a target of a registration request. The second user information 33 is information indicating one or more users whom the owner of the content desires to give permission to access the associated content data 32, and each user ID indicated in the second user information 33 matches any of the user IDs stored in the personal information table 10.

The user ID 34 is information indicating a request source user (namely, the owner of the content), and the user ID indicated by the user ID 34 matches any of the user IDs stored in the personal information table 10.

FIG. 3A shows that, for example, a request of a type "registration" (namely, a content registration request) requests a registration of content data "image data I", has second user information indicating "U0001" (namely, "Mary A Mount"), "U0002" (namely, "John B River"), and "U0004" (namely, "John D Marine"), and the request source is a user identified by a user ID "U0001" (namely, "Mary A Mount"). That is to say, it indicates that "Mary A Mount" who is the owner of "image data I" desires to give permission to "Mary A Mount", "John B River", and "John D Marine" to access the "image data I".

Note that although FIG. 3A shows an example in which the content data is image data, a content that can be registered in the access control device 100 is not limited to image data as described above, but may be various types of contents such as video data, audio data, and text data.

<Content Access Request>

FIG. 3B illustrates the data structure and examples of contents of a content access request 40.

The content access request 40 is a command transmitted from a terminal device to the access control device 100 by a user of the access control system 1000 when the user attempts to access a content registered in the access control device 100. As shown in FIG. 3B, the content access request 40 includes a type 41, a content ID 42, and a user ID 43.

The type 41 is information indicating a type of a request. In this example, a request in which "access" has been set in the type 41 is a content access request. The content ID 42 is identification information of a content that is the target of the request.

Note that after a content is registered in the access control device 100 based on the above content registration request, the one or more users, who are indicated by a piece of permitted user information associated with the registered content in the access control table 20, are informed by email that a content which the users are permitted to access has been registered. Also, the email contains the content ID of the registered content. The users specify the content ID in the content ID 42.

The user ID 43 is information indicating a request source user, and each user ID indicated in the user ID 43 matches any of the user IDs stored in the personal information table 10.

FIG. 3B shows that, for example, the target of a request of a type "access" (namely, a content access request) is a content with content ID "C0001", and the request source is a user identified by a user ID "U0002" (namely, "John B River").

<First User Information Update Request>

FIG. 3C illustrates the data structure and examples of contents of a first user information update request 50.

The first user information update request 50 is a command transmitted from a terminal device to the access control device 100 by a user of the access control system 1000 when the user attempts to update the first user information of the user registered in the personal information table 10.

As shown in FIG. 3C, the first user information update request 50 includes a type 51, a user ID 52, and first user information 53.

The type 51 is information indicating a type of a request. In this example, a request in which "update" has been set in the type 51 is a first user information update request.

The user ID 52 is information indicating a request source user, and each user ID indicated in the user ID 52 matches any of the user IDs stored in the personal information table 10. The first user information 53 is information indicating first user information after the update.

FIG. 3C shows that, for example, a request of a type "update" (namely, a first user information update request) was output by a request source user identified by a user ID "U0001" (namely, "Mary A Mount"), and the first user information after the update indicates "U0001" (namely, "Mary A Mount"), "U0002" (namely, "John B River"), and "U0003" (namely, "Mary C Wood").

<Operation>The following describes the operation of the access control device 100.

<Content Registration Process>

FIG. 4 is a flowchart showing the procedure of the content registration process performed by the access control device 100.

If the owner of a content performs a predetermined operation on the input unit 230 of a terminal device (200A, 200B, or 200C) to transmit a content registration request, the request transmission processing unit 251 of the control unit 250 generates and transmits a content registration request to the access control device 100 via the communication unit 210.

After the control unit 130 of the access control device 100 receives the content registration request from the above terminal device via the communication unit 110 (step S1), the content managing unit 135 generates a new content ID. In the following, the generated content ID is also referred to as "registration target content ID".

Here, in the example of the access control table 20 illustrated in FIG. 2B, each content ID is composed of alphabet "C" as one digit followed by a four-digit number. Accordingly, the content managing unit 135 generates a new content ID that is composed of the alphabet "C" as one digit followed by a four-digit number that is obtained by adding "1" to the largest number among those of the content IDs having already been registered.

The personal information detecting unit 131 detects personal information of one or more users of the access control system 1000 from content data (hereinafter also referred to as a "registration target content") that is contained in the received content registration request, and identifies one or more owners of the detected personal information (step S2).

More specifically, when the type of the registration target content is, for example, image data, the personal information detecting unit 131 performs an OCR (Optical Character Reader) process on the registration target content (namely, image data) to extract text data associated with images representing characters contained in the registration target content. The personal information detecting unit 131 then compares the extracted text data with each of the user IDs, user names, and email addresses registered in the personal information table 10. The personal information detecting unit 131 also extracts a group of image characteristics parameters from the registration target content and compares it with each facial data stored in the personal information table 10.

If this comparison finds a piece of data registered in the personal information table 10 that matches the extracted text data, the personal information detecting unit 131 obtains a user ID associated with the piece of data in the personal information table 10, and identifies a user having the obtained user ID as the owner of the detected personal information.

Note that, if the type of the registration target content is video data, the above comparison is performed, for example, on each frame image.

Also, if the type of the registration target content is, for example, text data, the registration target content (namely, text data) is compared with each of the user IDs, user names, and email addresses registered in the personal information table 10. If this comparison finds a piece of data registered in the personal information table 10 that matches the extracted text data, the personal information detecting unit 131 obtains a user ID associated with the piece of data in the personal information table 10, and identifies a user having the obtained user ID as the owner of the detected personal information.

Subsequent to this, the personal information detecting unit 131 judges whether personal information of a user of the access control system 1000 was detected in the detection process performed in the above step S2 (step S3), and if it judges that the personal information was not detected (step S3: NO), the content managing unit 135 stores the registration target content ID and the registration target content in association with each other in the storage unit 120. Also, the content managing unit 135 registers the registration target content ID and permitted user information, in which second user information contained in the content registration request received in step 51 is set, in association with each other in the access control table 20 stored in the storage unit 120 (step S4), and the access control device 100 ends the content registration process.

Note that in the above process, the content managing unit 135 notifies each user indicated by the registered permitted user information that an accessible content has been registered. This notification is called "content registration notification".

More specifically, the content managing unit 135 obtains a user name and an email address that are associated with a user ID in the personal information table 10, for each user ID contained in the permitted user information, and sends emails to the obtained email addresses, each of the email containing a content ID in the body of the message (for example, a content ID indicated by "M7" in FIG. 11A). Furthermore, the content managing unit 135 similarly transmits the content registration notification to the owner of the content who made the content registration request.

If the personal information detecting unit 131 judges that the personal information of the user of the access control system 1000 was detected in the detection process in step S2 (step S3: YES), the judgment unit 132 judges whether or not the process of step S6, which will be described in the following, has been performed with respect to each owner of all the identified pieces of personal information (step S5).

If it is judged that the process has not been performed for all the owners of the identified pieces of personal information (step S5: NO), the judgment unit 132 selects a user ID of an owner (hereinafter referred to as a "target user") of personal information among the one or more owners who have not been subjected to the process, and obtains a piece of first user information associated with the selected user ID in the personal information table 10.

The judgment unit 132 judges whether or not there is an out-of-range user, based on the obtained first user information and the second user information contained in the content registration request received in step 51 (step S6).

More specifically, the judgment unit 132 judges that there is an out-of-range user if there is a user who is not included in the one or more users indicated by the first user information, but is included in the one or more users indicated by the second user information (step S6: YES).

If it judges that there is no out-of-range user (stepS6: NO), the judgment unit 132 performs the process again from step S5.

If the judgment unit 132 judges that there is an out-of-range user (stepS6: YES), the content modifying unit 133 modifies the registration target content so that one or more users other than the target user cannot be identified from personal information of the one or more other users, among all pieces of personal information contained in the registration target content (step S7).

More specifically, for example, when the registration target content is image data or video data, the content modifying unit 133 performs what is called "mosaic processing" on image portions that include personal information of the other users.

Also, for example, when the registration target content is text data, the content modifying unit 133 performs a process (what is called "turned-letter process") for replacing characters representing personal information of the one or more other users with a sequence of particular character such as "●".

Subsequent to this, the adjustment unit 134 transmits an adjustment request including the registration target content modified by the content modifying unit 133 to the target user (step S8).

More specifically, the adjustment unit 134 obtains an email address associated with a user ID of the target user in the personal information table 10, and obtains (i) a user name associated with a user ID of the request source included in the content registration request received in step 51 and (ii) a user name of an out-of-range user, from the personal information table 10. Then, the adjustment unit 134 generates an email, for example, as shown in FIG. 10A, that includes a registration target content ID (indicated by "M1") in the "Subject" field, and includes user names of out-of-range users (indicated by "M2") in the body of the message, and transmits the email to the obtained email address.

Note that, upon receiving the adjustment request via the communication unit 210, the adjustment request processing unit 252 of the control unit 250 in the terminal device (200A, 200B, or 200C) of the target user displays a screen of the received adjustment request (a screen of email as shown in FIG. 10A) on the LCD of the output unit 240, generates a response to the adjustment request based on inputs from the input unit 230, and transmits the response to the access control device 100 via the communication unit 210.

In this example, the adjustment request processing unit 252 generates and transmits an email which includes, as shown in FIG. 10B, a registration target content ID (indicated by "M3") in the "Subject" field, and includes "1" (indicated by "M4") in the body of the message, as a response indicating that the user agrees with permitting the out-of-range users to access the content.

Also, the adjustment request processing unit 252 generates and transmits an email which includes, as shown in FIG. 10C, a registration target content ID (indicated by "M5") in the "Subject" field, and includes "0" (indicated by "M6") as the body of the message, as a response indicating that the user does not agree with permitting the out-of-range users to access the content.

The adjustment unit 134 judges whether or not a response agreeing with permitting the out-of-range user to access the content has been received (step S9).

More specifically, in this example, if an email, which includes a registration target content ID in the "Subject" field, and includes "1" in the body of the message, has been received from the address of the adjustment request transmitted in step S8, it is judged that a response, which agrees with permitting the out-of-range user to access the content, has been received (step S9: YES).

If it is judged that a response, which does not agree with permitting the out-of-range user to access the content, has been received (step S9: NO), the judgment unit 132 performs the process again from step S5. Note that the judgment unit 132 also performs the process again from step S5 if any response is not received within a predetermined time period after the transmission of the adjustment request in step S8.

Also, if it is judged that a response, which agrees with permitting the out-of-range user to access the content, has been received (step S9: YES), the personal information table updating unit 136 adds the user ID of the out-of-range user to a piece of first user information associated with the user ID of the target user in the personal information table 10 (step S10), and the judgment unit 132 performs the process again from step S5.

If it is judged that the process with respect to each owner of all the identified pieces of personal information has been performed (step S5: YES), the content managing unit 135 stores the registration target content ID and the registration target content in association with each other in the storage unit 120. Furthermore, the content managing unit 135 registers (i) the registration target content ID, (ii) personal information owner information composed of respective one or more user IDs of one or more personal information owners detected in step S2, and (iii) permitted user information, which is composed of one or more user IDs that are identified as explained below, in association with each other in the access control table 20 stored in the storage unit 120 (step S11), and the access control device 100 ends the content registration process.

The one or more user IDs constituting the above-mentioned permitted user information are identified as follows.

That is to say, the content managing unit 135 obtains pieces of first user information that are associated in the personal information table 10 with one or more user IDs of owners of all pieces of personal information detected in step S2, and identifies user IDs, which are included in both (i) the one or more user IDs included in the obtained first user information and (ii) the user IDs included in the second user information contained in the content registration request received in step S1, as the one or more user IDs constituting the above-mentioned permitted user information.

Note that the content managing unit 135, as is the case with the process in step S4 above, sends a content registration notification to the one or more users indicated by the registered permitted user information and to the owner of the content who made the content registration request.

<Access-to-Content Control Process>

Figure 5:
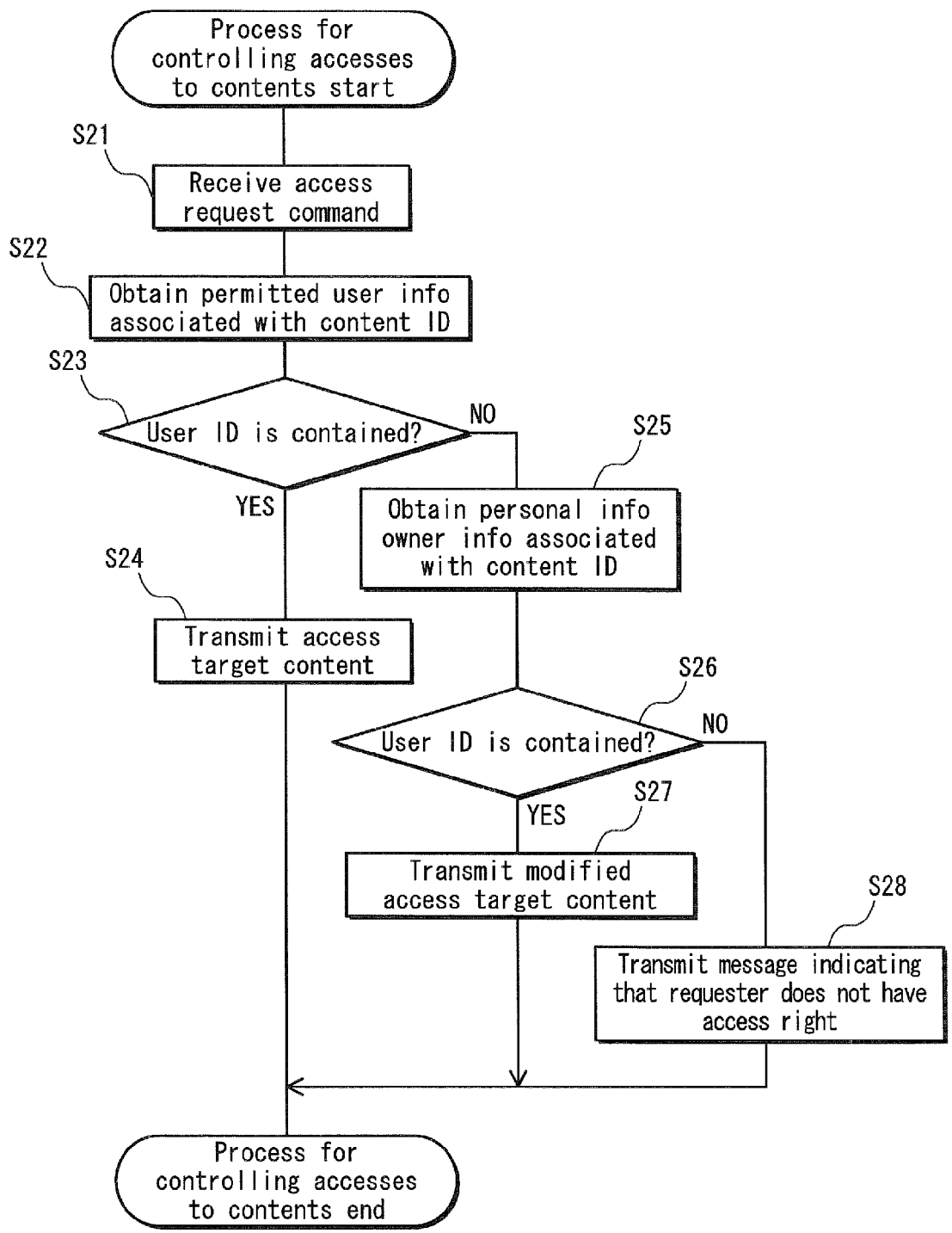
FIG. 5 is a flowchart showing the procedure of the process for controlling accesses to registered contents in Embodiment 1.

FIG. 5 is a flowchart showing the procedure of the process for controlling accesses to registered contents performed by the access control device 100.

If a user who desires to access a content performs a predetermined operation on the input unit 230 of a terminal device (200A, 200B, or 200C) to transmit a content access request, the request transmission processing unit 251 of the control unit 250 generates and transmits a content access request to the access control device 100 via the communication unit 210.

Note that the predetermined operation performed to transmit a content access request includes an operation for specifying a content ID of a content requested to be accessed. As described above, when a content is registered, a content registration notification (email) including a content ID of a registered content is transmitted to each user indicated by the permitted user information. Thus the content ID is specified by referring to the contents of the content registration notification.

If the control unit 130 of the access control device 100 receives a content access request from the terminal device (200A, 200B, or 200C) via the communication unit 110 (step S21), the access request processing unit 137 obtains a content ID contained in the content access request and a piece of permitted user information associated with it in the access control table 20 stored in the storage unit 120 (step S22).

The access request processing unit 137 judges whether or not the user ID contained in the content access request received in step S21 is contained in the obtained permitted user information (step S23). If it judges that the user ID is contained in the obtained permitted user information (step S23: YES), the access request processing unit 137 obtains a content (hereinafter also referred to as an "access target content"), which is stored in the storage unit 120 in association with the content ID contained in the content access request, and transmits the access target content to the terminal device (200A, 200B, or 200C) which is the transmission source of the content access request (step S24), and the access control device 100 ends the process for controlling accesses to registered contents.

Note that, upon receiving the access target content via the communication unit 210, the received content processing unit 253 of the control unit 250 in the terminal device (200A, 200B, or 200C), which is the transmission source of the content access request, outputs data to the liquid crystal display or the speaker of the output unit 240 depending on the type of the received access target content.

On the other hand, if it is judged that the user ID contained in the content access request received in step S21 is not contained in the obtained permitted user information (step S23: NO), the access request processing unit 137 obtains personal information owner information that is associated, in the access control table 20 in the storage unit 120, with the content ID contained in the content access request (step S25).

Also, the access request processing unit 137 judges whether or not the user ID contained in the content access request is contained in the obtained personal information owner information (step S26). If it is judged that the user ID is contained in the obtained personal information owner information (step S26: YES), the content modifying unit 133, as is the case with the process in step S7 of FIG. 4, modifies the access target content so that one or more users other than the user who made the access request cannot be identified from pieces of personal information of the one or more other users, among pieces of personal information contained in the registration target content. The access request processing unit 137 transmits the modified access target content to the terminal device which is the transmission source of the content access request (step S27), and the access control device 100 ends the process for controlling accesses to registered contents.

Note that, upon receiving the modified access target content via the communication unit 210, the received content processing unit 253 of the control unit 250 in the terminal device, which is the transmission source of the content access request, outputs data to the liquid crystal display or the speaker of the output unit 240 depending on the type of the received access target content.

Also, if it is judged that the user ID contained in the content access request is not contained in the obtained personal information owner information (step S26: NO), the access request processing unit 137 transmits a message to the terminal device which is the transmission source of the content access request, the message indicating that the requester does not have an access right (step S28), and the access control device 100 ends the process for controlling accesses to registered contents.

Note that, upon receiving, via the communication unit 210, the message indicating that the requester does not have an access right, the received content processing unit 253 of the control unit 250 in the terminal device which is the transmission source of the content access request displays the message on the liquid crystal display of the output unit 240.

<First User Information Update Process>

Figure 6:
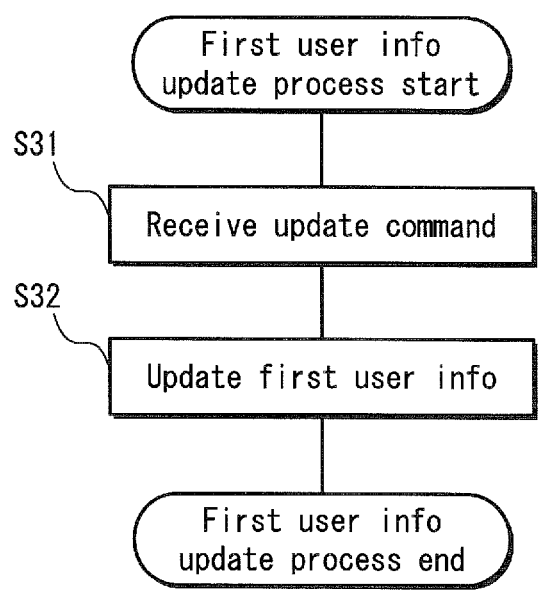
FIG. 6 is a flowchart showing the procedure of the first user information update process in Embodiment 1.

FIG. 6 is a flowchart showing the procedure of the first user information update process performed by the access control device 100.

If a user who desires to updates the contents of the first user information performs a predetermined operation on the input unit 230 of a terminal device (200A, 200B, or 200C) to transmit a first user information update request, the request transmission processing unit 251 of the control unit 250 generates and transmits a first user information update request to the access control device 100 via the communication unit 210.

The control unit 130 of the access control device 100 receives a first user information update request from the above terminal device (200A, 200B, or 200C) via the communication unit 110 (step S31).

The personal information table updating unit 136 updates a piece of first user information in the personal information table 10 in the storage unit 120, the piece of first user information being associated with a user ID contained in the received first user information update request, with a piece of first user information contained in the received first user information update request (step S32), and the access control device 100 ends the first user information update process.

Note that, if, in the personal information table 10 in the storage unit 120, there is no piece of first user information associated with a user ID contained in the received first user information update request, of course the process in step S32 is not performed, and the access control device 100 ends the first user information update process.

<Specific Example>

Figure 7A:
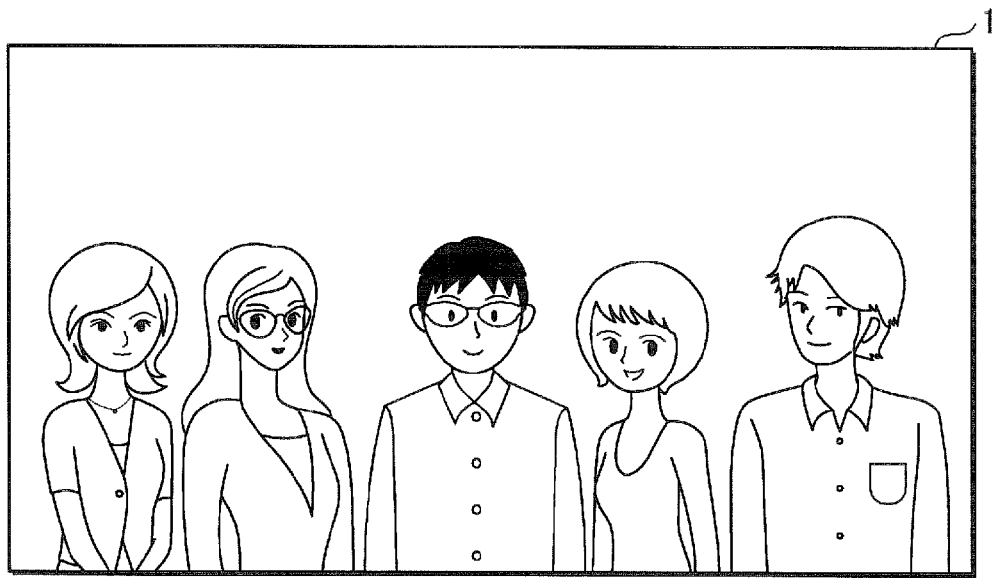
FIGS. 7A and 7B illustrate image data 1, which is an example of a registration target content, and an example of a detection result of personal information of users.

The following describes the content registration process performed by the access control device 100, taking as an example the case where image data 1 shown in FIG. 7A is registered, with reference to the flowchart shown in FIG. 4.

It is presumed here that, at the time of the start of the following description, the contents of the personal information table 10 and the access control table 20 are as shown in FIGS. 2A and 2B.

It is also presumed that the owner of the registration target content (image data 1) shown in FIG. 7A is "Mary C Wood" whose user ID is "U0003", the owner of the content desires to give permission to users with user IDs "U0001" to "U0004" to access the content, and the owner of the content is using the terminal device 200A.

If the owner (Mary C Wood) of the content performs a predetermined operation on the input unit 230 of the terminal device 200A to transmit a content registration request, the request transmission processing unit 251 of the control unit 250 generates a content registration request whose type is "registration", content data is "image data I", and second user information indicates "U0001, U0002, U0003, U0004", and transmits the generated content registration request to the access control device 100 via the communication unit 210.

After the control unit 130 of the access control device 100 receives the content registration request from the above terminal device 200A via the communication unit 110 (step S1), the content managing unit 135 generates a new content ID (in this example, the content ID is presumed to be "C1001").

The personal information detecting unit 131 detects personal information of one or more users of the access control system 1000 from content data (image data 1) that is contained in the received content registration request, and identifies one or more owners of the detected personal information (step S2).

In this example, it is presumed that the personal information detecting unit 131 performs an OCR on the image data 1 to extract text data, and compares the extracted text data with each of the user IDs, user names, and email addresses registered in the personal information table 10, but fails to find a match between these data.

Figure 7B:
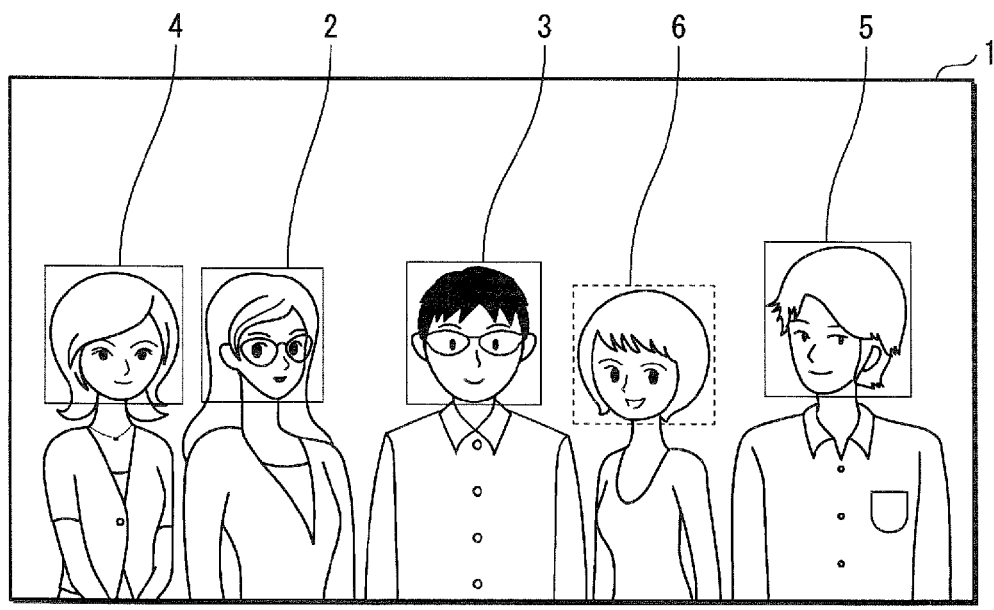

Furthermore, the personal information detecting unit 131 compares the image data 1 with each facial data registered in the personal information table 10, and as shown in FIG. 7B, detects a facial image 2 from a comparison with facial data A, a facial image 3 from a comparison with facial data B, a facial image 4 from a comparison with facial data C, and a facial image 5 from a comparison with facial data D, and identifies user IDs "U0001" to "U0004" associated with the facial data A to D in the personal information table 10, respectively.

Note that with the personal information detection method explained here, personal information of persons other than the users of the access control system 1000 cannot be detected. A facial image 6 enclosed in a dotted-line box in FIG. 7B indicates a facial image that could not be detected by the comparison with each facial data registered in the personal information table 10, for the sake of explanation.

In the above detection process in step S2, the personal information detecting unit 131 detects personal information of users of the access control system 1000 (step S3: YES), and it is judged that the process of step S6, which is described in the following, has not been performed for all the owners (users with user IDs "U0001" to "U0004") of the identified pieces of personal information (step S5: NO), the judgment unit 132 selects a user ID (in this example, "U0001") of the target user, and obtains the selected user ID and a piece of first user information (U0001, U0002) associated with the selected user ID in the personal information table 10.

According to this example, the obtained first user information is "U0001, U0002", and the second user information is "U0001, U0002, U0003, U0004". Therefore the judgment unit 132 judges that there are out-of-range users ("U0003" and "U0004"), who are not included in the users indicated by the first user information, and who are included in the users indicated by the second user information (step S6: YES).

Subsequent to this, the content modifying unit 133 modifies the registration target content so that users other than the target user ("Mary A Mount" with user ID "U0001") cannot be identified from pieces of personal information of the other users, among pieces of personal information contained in the registration target content (step S7).

More specifically, the content modifying unit 133 performs the mosaic processing on the facial images 3 to 5 shown in FIG. 7B.

Figure 8:
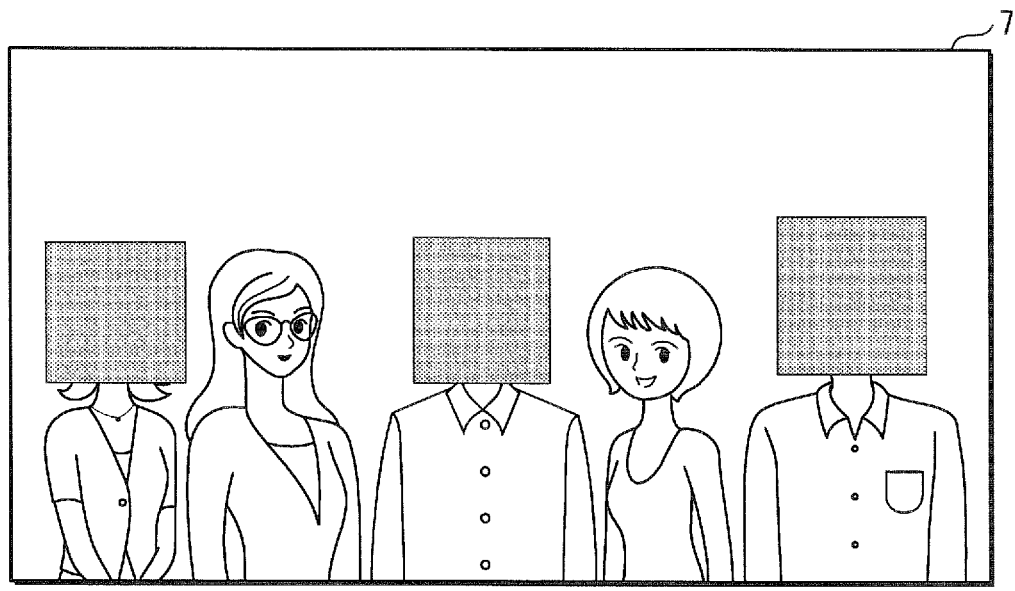
FIG. 8 illustrates image data 7 after the image data 1 has been subjected to the mosaic processing.

FIG. 8 illustrates image data 7 after the image data 1 has been subjected to the mosaic processing.

The portions painted all gray in FIG. 8 indicate that the mosaic processing was performed on them.

Subsequent to this, the adjustment unit 134 transmits an adjustment request including the registration target content (image data 7) modified by the content modifying unit 133 to the target user (step S8).

More specifically, the adjustment unit 134 obtains an email address (aoa@aaa.com) associated with a user ID (U0001) of the target user in the personal information table 10, and obtains (i) a user name (Mary C Wood) associated with a user ID (U0003) of the request source included in the content registration request received in step 51 and (ii) user names ("Mary C Wood" and "John D Marine") of out-of-range users ("U0003" and "U0004"), from the personal information table 10. Then, the adjustment unit 134 generates an email, for example, as shown in FIG. 10A, that includes a registration target content ID (C1001) in the "Subject" field, and includes user names ("Mary C Wood" and "John D Marine") of out-of-range users in the body of the message, and transmits the email to the obtained email address.

In this example, it is presumed that, upon receiving the adjustment request, the terminal device used by the target user (Mary A Mount) generates, based on the inputs from the input unit 230, a response indicating that the user does not agree with permitting the out-of-range users to access the content, as shown in FIG. 10C, and transmits the generated response to the access control device 100.

Accordingly, in this example, the adjustment unit 134 receives a response which does not agree with permitting the out-of-range user to access the content (step S9: NO), and the judgment unit 132 performs the process again from step S5.

Here, it is judged that the process of step S6, which is described in the following, has not been performed for all the owners of the identified pieces of personal information (step S5: NO), thus the judgment unit 132 selects a user ID (in this example, "U0002") of the target user, and obtains a piece of first user information (U0002, U0004) associated with the selected user ID in the personal information table 10.

In this example, the obtained first user information is "U0002, U0004", and the second user information is "U0001, U0002, U0003, U0004". Accordingly, it is judged that there are out-of-range users ("U0001" and "U0003") (step S6: YES).

Subsequent to this, the content modifying unit 133 modifies the registration target content so that users other than the target user ("John B River" with user ID "U0002") cannot be identified from pieces of personal information of the other users, among pieces of personal information contained in the registration target content, namely so that the mosaic processing is performed on the facial images 2, 4 and 5 illustrated in FIG. 7B (step S7).

Subsequent to this, the adjustment unit 134 transmits an adjustment request including the registration target content modified by the content modifying unit 133 to the target user (step S8).

In this example, it is presumed that, upon receiving the adjustment request, the terminal device used by the target user (John B River) generates, based on the inputs from the input unit 230, a response indicating that the user agrees with permitting the out-of-range users to access the content, as shown in FIG. 10B, and transmits the generated response to the access control device 100.

Accordingly, in this example, the adjustment unit 134 receives a response which agrees with permitting the out-of-range users to access the content (step S9: YES). Thus the personal information table updating unit 136 adds the user IDs ("U0001" and "U0003") of the out-of-range users to a piece of first user information (U0002, U0004) associated with the user ID (U0002) of the target user in the personal information table 10 (step S10), and the judgment unit 132 performs the process again from step S5.

Here, it is judged that the process of step S6, which is described in the following, has not been performed for all the owners of the identified pieces of personal information (step S5: NO), thus the judgment unit 132 selects a user ID (in this example, "U0003") of the target user, and obtains a piece of first user information ("U0001, U0002, U0003, U0004") associated with the selected user ID in the personal information table 10.

In this example, at this point, the obtained first user information is "U0001, U0002, U0003, U0004" and the second user information is "U0001, U0002, U0003, U0004", thus the judgment unit 132 judges that there is no out-of-range user (stepS6: NO), and performs the process again from step S5.

Here, it is judged that the process of step S6, which is described in the following, has not been performed for all the owners of the identified pieces of personal information (step S5: NO), thus the judgment unit 132 selects a user ID (in this example, "U0004") of the target user, and performs the process in the same way as when the target user is "Mary A Mount".

Note that in this example, it is presumed that the terminal device, which is used by the target user (John D Marine) who receives this adjustment request, generates, based on the inputs from the input unit 230, a response indicating that the user does not agree with permitting the out-of-range users to access the content, and transmits the generated response to the access control device 100.

In this example, at this point, the contents of the personal information table 10 have been updated from those shown in FIG. 2A, the contents before the start of the content registration process requested by the terminal device 200A, to those shown in FIG. 9A.

In this example, at this point, it is judged that the process with respect to each owner of all the identified pieces of personal information has been performed (step S5: YES), the content managing unit 135 stores the registration target content ID (C1001) and the registration target content (image data 1) in association with each other in the storage unit 120.

Also, the content managing unit 135 obtains respective pieces of first user information associated with user IDs (U0001, U0002, U0003 and U0004) of owners of all pieces of personal information detected in step S2. The content managing unit 135 identifies user IDs (U0001, U0002), which are included in both (i) the user IDs included in the obtained first user information and (ii) the user IDs included in the second user information (U0001, U0002, U0003, U0004) contained in the content registration request received in step 51, as the user IDs constituting the above-mentioned permitted user information.

The content managing unit 135 registers, in association with each other in the access control table 20 stored in the storage unit 120, (i) the above content ID (C1001), (ii) personal information owner information composed of respective user IDs (U0001, U0002, U0003, U0004) of personal information owners detected in step S2, and (iii) permitted user information which is composed of the identified user IDs (U0001, U0002) (step S11), and the access control device 100 ends the content registration process.

<<Modification>>

Embodiment 1 describes an example in which, upon receiving a content registration request, the access control device 100 makes an adjustment request as necessary.

In Modification described in the following, upon receiving a content registration request, the content specified in the request is registered, and then upon receiving a request to access the content for the first time, an adjustment request is made as necessary.

With this structure, if no access request is made for a content, no adjustment request is made for the content. Accordingly, compared with the case where an adjustment request is made when a content is registered, it is possible to reduce the load of the access control device for processing the adjustment request and to save the user the trouble of responding to the adjustment request.

In an access control device in this modification (hereinafter referred to as a "modified access control device"), the function of the control unit 130 of the access control device 100 and the data structure of the access control table have been modified slightly. Thus the following description centers on the modified part of the access control device 100.

Note that in the following description, an access control system including this modified access control device is referred to as a "modified access control system".

<Data>

FIG. 12 illustrates the data structure and examples of contents of an access control table 60 stored in the storage unit 120 of the modified access control device.

The access control table 60 is information composed one or more sets of the content ID 21, the personal information owner information 22, second user information 61 and the permitted user information 23, each set being associated with a different one of contents registered in the modified access control device.

Here, the content ID 21, the personal information owner information 22, and the permitted user information 23 are the same as the data items of the access control table 20, and the second user information 61 is the second user information included in the content registration request for an associated content.

FIG. 12 shows, for example, the following: a content identified by content ID "C0001" includes personal information which is owned by a user indicated as "U0001" by the personal information owner information. Users are indicated as "U0001" (namely, Mary A Mount), "U0002" (namely, John B River), and "U0003" (namely, Mary C Wood)" by the second user information. Also, permitted users are indicated as "U0001" and "U0002" by the permitted user information. That is to say, it indicates that the owner of the content desires to give permission to "Mary A Mount", "John B River", and "Mary C Wood" to access the content.

<Operation>

The following explains the operation of the modified access control device.

<Content Registration Process>

Figure 13:
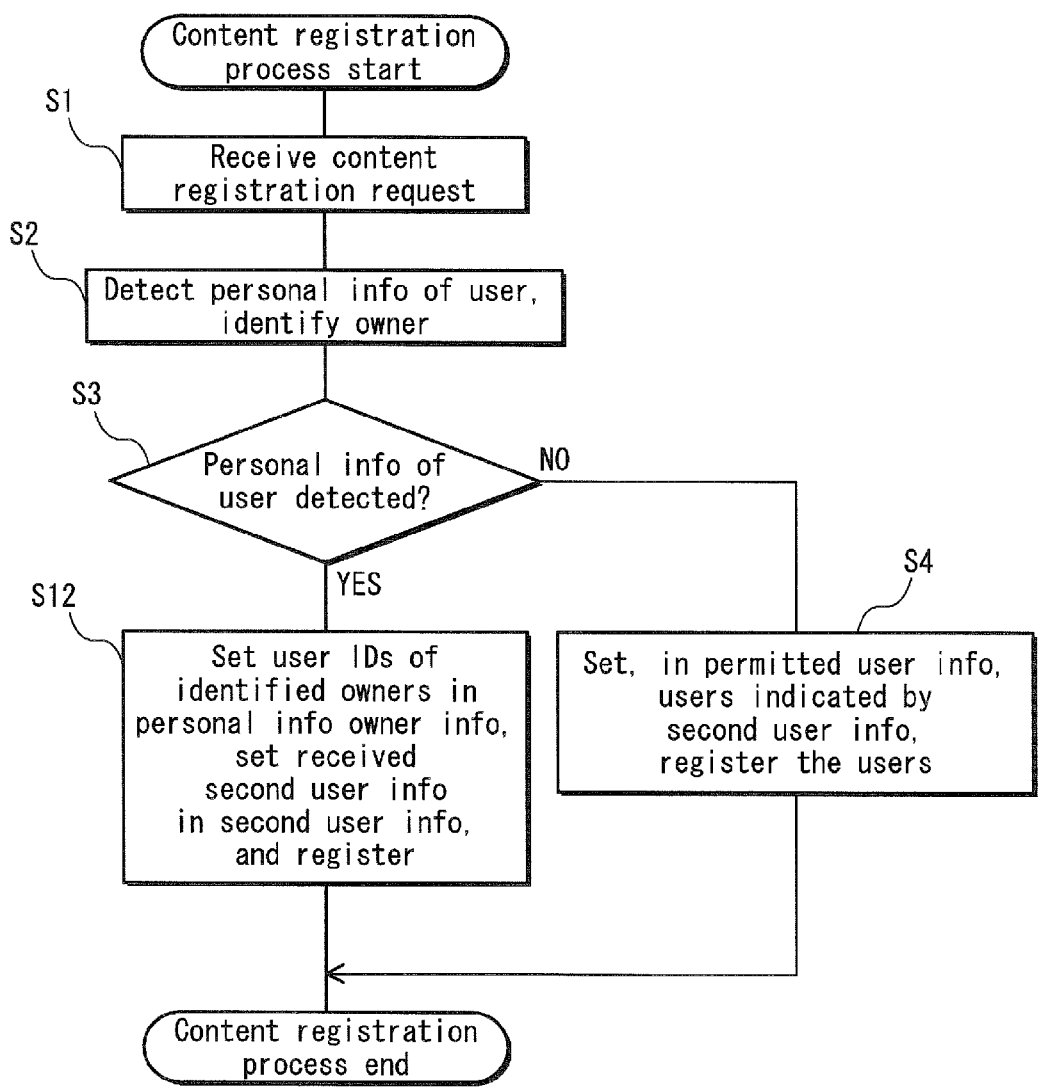
FIG. 13 is a flowchart showing the procedure of the content registration process in Modification.

FIG. 13 is a flowchart showing the procedure of the content registration process performed by the modified access control device.

Among the content registration process performed by the modified access control device, the process performed in steps S1 to S4 is the same as the process performed in steps S1 to S4 in the content registration process by the access control device 100 in Embodiment 1 (see FIG. 4).

Accordingly, the following description explains the process performed in step S12 if the judgment in step S3 is affirmative (step S3: YES).

In the above detection process in step S2, if the personal information detecting unit 131 of a control unit (hereinafter referred to as a "modified control unit") in the modified access control device detects personal information of one or more users of the modified access control system (step S3: YES), a content managing unit (hereinafter referred to as a "modified content managing unit") in the modified control unit stores the registration target content ID and the registration target content in association with each other in the storage unit 120.

Also, the modified content managing unit registers (i) the registration target content ID, (ii) personal information owner information composed of one or more user IDs of the one or more personal information owners detected in step S2, and (iii) the second user information included in the content registration request received in step 51, in association with each other in the access control table 60 stored in the storage unit 120 (step S12), and the modified access control device ends the content registration process.

Note that in the above process, the modified content managing unit notifies each user indicated by the second user information that a content which might be permitted to be accessed has been registered. Hereinafter, this notification is called "content provisional registration notification". This notification is sent in the same manner as the content registration notification in Embodiment 1, and the contents of the notification are, for example, as shown in FIG. 11B. As shown in FIG. 11B, the content provisional registration notification includes a content ID (indicated by "M8") in the body of the message, as in the content registration notification shown in FIG. 11A.

<Access-to-Content Control Process>

Figure 14:
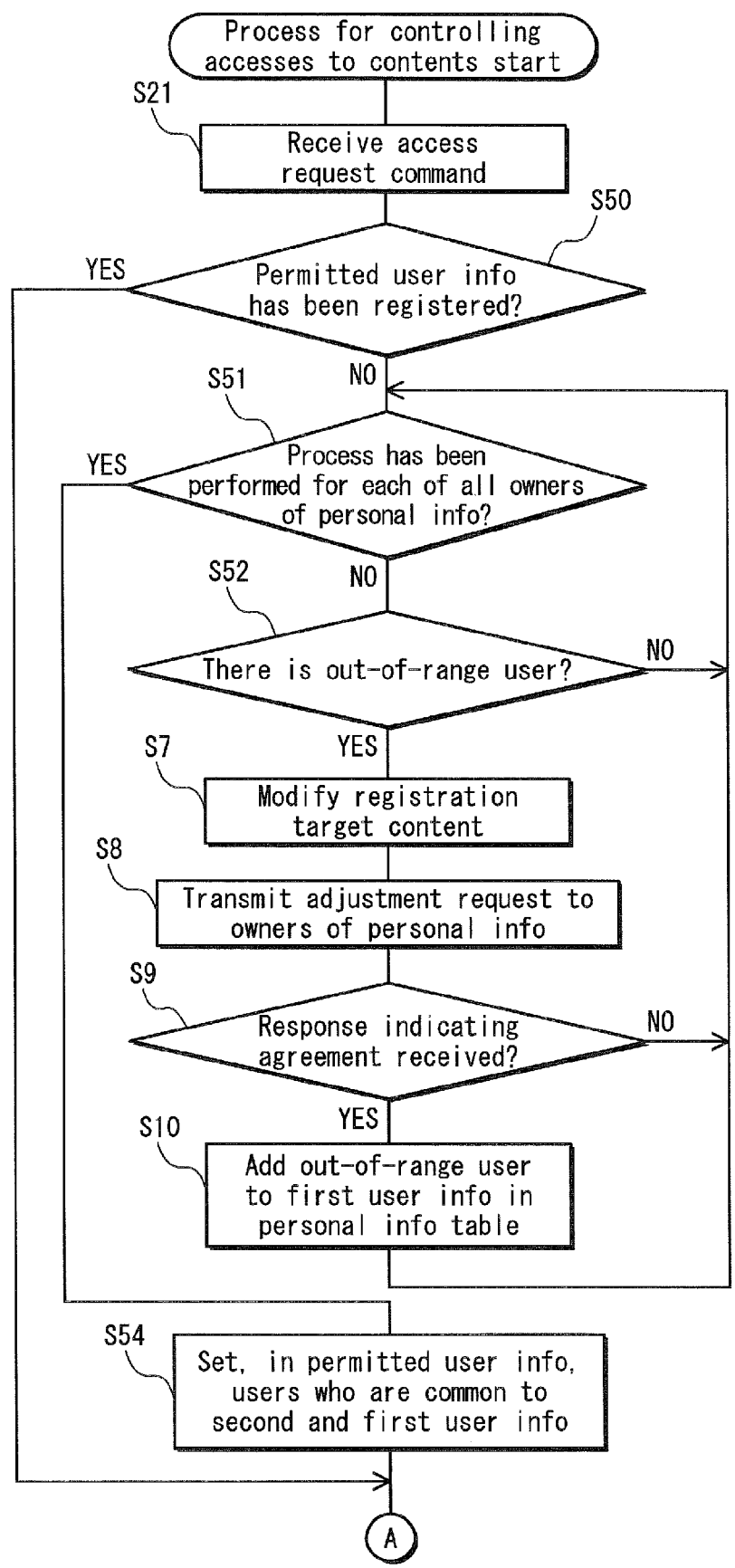
FIG. 14 is a flowchart showing the procedure of the process for controlling accesses to registered contents in Modification, continuing to FIG. 15.
Figure 15:
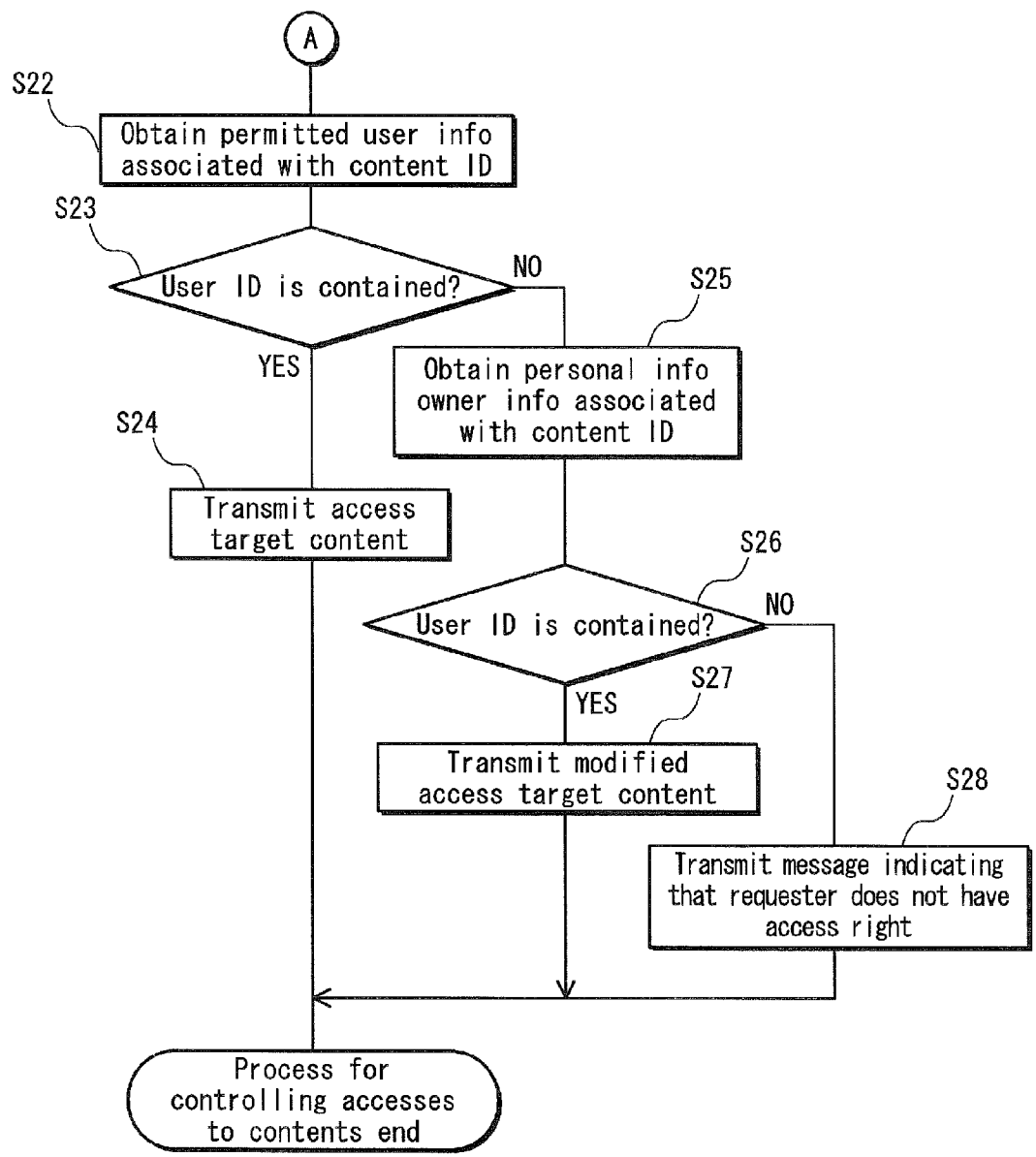
FIG. 15 is a flowchart showing the procedure of the process for controlling accesses to registered contents in Modification, continued from FIG. 14.

FIGS. 14 and 15 are flowcharts showing the procedure of the process for controlling accesses to registered contents performed by the modified access control device.

If the modified control unit of the modified access control device receives a content access request from a terminal device (200A, 200B, or 200C) via the communication unit 110 (step S21 in FIG. 14), a judgment unit (hereinafter referred to as "modified judgment unit") of the modified control unit judges whether or not permitted user information has been registered in a record of the access control table 60 that includes the content ID contained in the content access request received in step S21 (step S50).

If it is judged that permitted user information has been registered (step S50: YES), the control proceeds to the process in step S22 shown in FIG. 15.

On the other hand, it is judged that permitted user information has not been registered (step S50: NO), the modified judgment unit obtains a piece of personal information owner information and a piece of second personal information that are associated, in the access control table 60, with the content ID included in the content registration request received in step S21, and judges whether or not the process of step S52, which will be described in the following, has been performed with respect to each owner of all pieces of personal information indicated by the personal information owner information, in the same manner as the process of step S5 shown in FIG. 4 (step S51).

If it is judged that the process has not been performed for all the owners of the pieces of personal information (step S51: NO), the modified judgment unit selects a user ID of a target user, and obtains a piece of first user information associated with the selected user ID in the personal information table 10.

The modified judgment unit judges whether or not there is an out-of-range user, based on the obtained first user information and the second user information, in the same manner as the process of step S6 shown in FIG. 4 (step S52).

If it judges that there is not an out-of-range user (step S52: NO), the modified judgment unit performs the process again from step S51; and if it judges that there is an out-of-range user (step S52: YES), the modified judgment unit performs the process of steps S7 to S10 in the same manner as the process explained in Embodiment 1.

If it is judged that the process with respect to each owner of all the pieces of personal information has been performed (step S51: YES), the modified content managing unit obtains one or more pieces of first user information that are associated, in the personal information table 10, respectively with one or more user IDs included in the personal information owner information associated, in the access control table 60, with the content ID included in the content registration request received in step S21. The modified content managing unit identifies certain user IDs as the user IDs constituting the permitted user information, based on the obtained first user information and the second user information, in the same manner as in step S11 shown in FIG. 4.

The modified content managing unit sets the identified user IDs in the permitted user information associated, in the access control table 60, with the content ID included in the content access request received in step S21 (step S54).

The process of the subsequent steps S22 to S28 is the same as the process of steps S21 to S28 in the process for controlling accesses to registered contents performed by the access control device 100 in Embodiment 1 (see FIG. 5), and thus description thereof is omitted.

<<Embodiment 2>>

In Embodiment 1, if a user having received an adjustment request agrees with permitting one or more out-of-range users to access a content, the first user information of the user is updated to include the one or more out-of-range users.

However, there is a case where, even with regard to the same out-of-range user, a user desires to select whether or not to agree with permitting the out-of-range user to access a content, depending on the subject of each content including the personal information of the user himself/herself. Also, there is a case where a user, who once did not agree with permitting an out-of-range user to access a content, changes his/her mind later and desires to agree with it, and there is a reverse case.

In view of this, Embodiment 2 describes an example in which each user can flexibly select whether or not to agree with permitting an out-of-range user to access a content, for each content that includes personal information of the user himself/herself, and can change the selection later.

<Structure>

Figure 16:
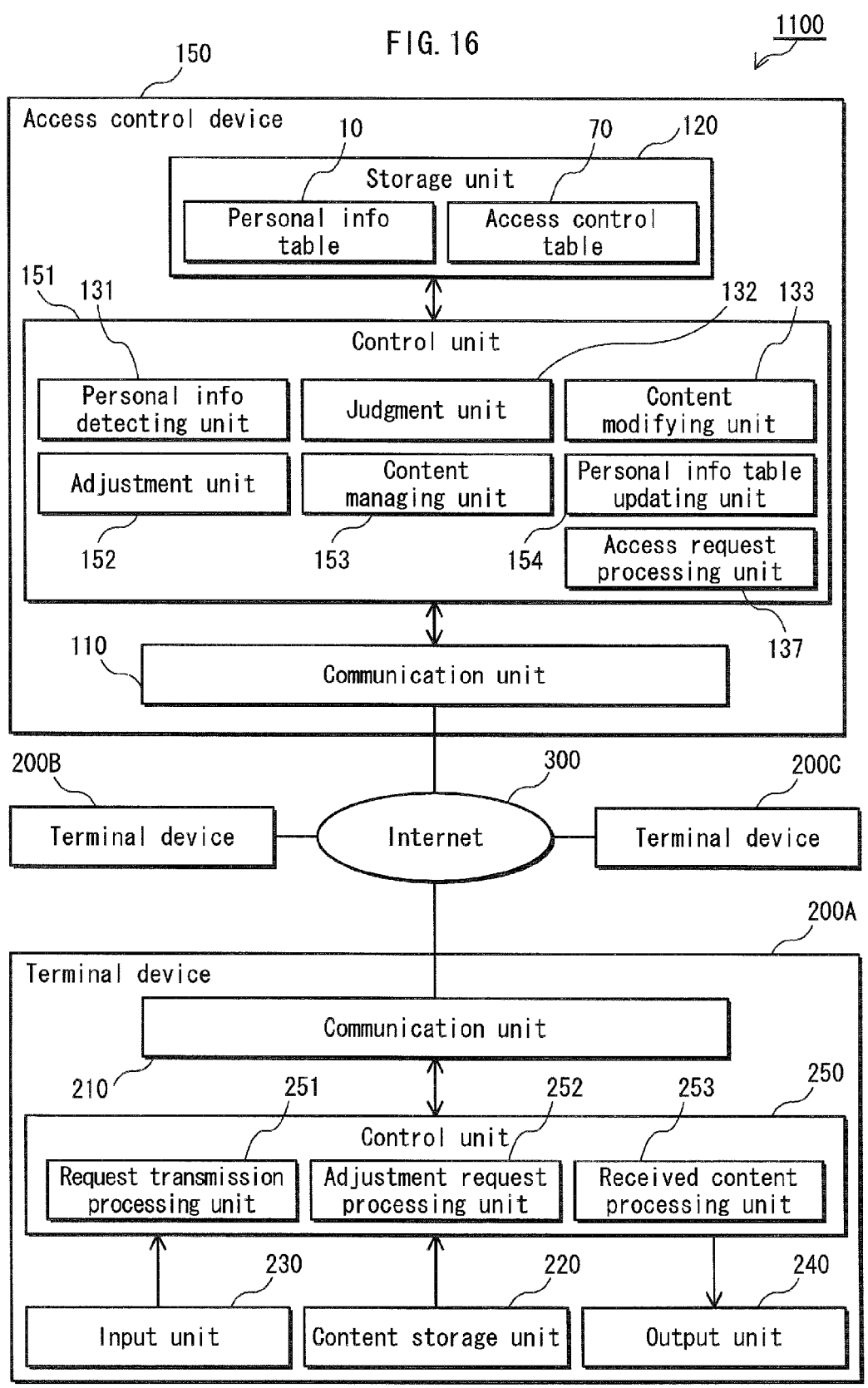
FIG. 16 illustrates a system structure of an access control system 1100 in Embodiment 2.

FIG. 16 illustrates a system structure of an access control system 1100 in Embodiment 2.

The access control system 1100 includes an access control device 150 in place of the access control device 100 of the access control system 1000 in Embodiment 1.

The access control device 150 includes a control unit 151 in place of the control unit 130 of the access control device 100 in Embodiment 1. Also, the storage unit 120 of the access control device 150 stores an access control table 70 in which the data structure of the access control table 20 in Embodiment 1 has been changed slightly.

Furthermore, the control unit 151 includes an adjustment unit 152, content managing unit 153, and personal information table updating unit 154 in which the respective functions of the adjustment unit 134, content managing unit 135, and personal information table updating unit 136 have been changed slightly.

<Data>
<Access Control Table>

FIG. 17A illustrates the data structure and examples of contents of the access control table 70.

The access control table 70 is information composed of one or more sets of a content ID 21, personal information owner information 22, second user information 61, and permitted user information 23, each set being associated with a different one of contents registered in the access control device 150. The access control table 70 also includes first user information 71 in association with each piece of personal information owner information 22.

Here, the content ID 21, personal information owner information 22, and permitted user information 23 are the same as the data items of the access control table 20 in Embodiment 1. The second user information 61 is the same as the data item of the access control table 60 in Modification.

The first user information 71 is information indicating, for each user indicated by an associated piece of personal information owner information, one or more users whom the user permits to access the contents that include the personal information of the user.

FIG. 17A shows that, for example, the personal information included in a content with content ID "C0004" includes personal information that are owned by users identified by personal information owner information "U0001" and "U0003", and a user (namely, "Mary A Mount") identified by the personal information owner information "U0001" is associated with first user information "U0001" and "U0002" with regard to this content, and a user (namely, "Mary C Wood") identified by the personal information owner information "U0003" is associated with first user information "U0001", "U0002", "U0003", and "U0004". Also, the content with content ID "C0004" is associated with second user information "U0001", "U0002", and "U0003", and associated with permitted user information "U0001" and "U0002".

Furthermore, in FIG. 17A, the personal information included in a content with content ID "C0005" includes personal information that are owned by users identified by personal information owner information "U0001" and "U0002", and a user identified by the personal information owner information "U0001" is associated with first user information "U0001", "U0002", and "U0003".

That is to say, the content with content ID "C0004" and the content with content ID "C0005" are associated with different pieces of first user information, with regard to the same user identified by personal information owner information "U0001". As apparent from this, the access control table 70 enables one or more owners of personal information included in a content to set, for each content, any number of desired users whom the one or more owners permit to access the content.

<First User Information Update Request>

FIG. 17B illustrates the data structure and examples of contents of a first user information update request 55.

As shown in FIG. 17B, the first user information update request 55 includes the type 51, a content ID 56, the user ID 52, and the first user information 53.

Here, the type 51, the user ID 52, and the first user information 53 are the same as the data items of the first user information update request 50. The content ID 56 is identification information of a request target content, and is specified when only the first user information for a predetermined content having been registered in the access control device 150 is to be updated.

That is to say, when no content ID is specified in the content ID 56, the first user information for all the contents are updated, as will be described below.

FIG. 17B shows that, for example, the target of a request of a type "update" (namely, a first user information update request) is a content with content ID "C0004", and the request source is a user identified by a user ID "U0001" (namely, "Mary A Mount"), and the first user information after the update indicates "U0001" (namely, "Mary A Mount"), "U0002" (namely, "John B River"), and "U0003" (namely, "Mary C Wood").

<Operation>

The following describes the operation of the access control device 150.

<Content Registration Process>

Figure 18:
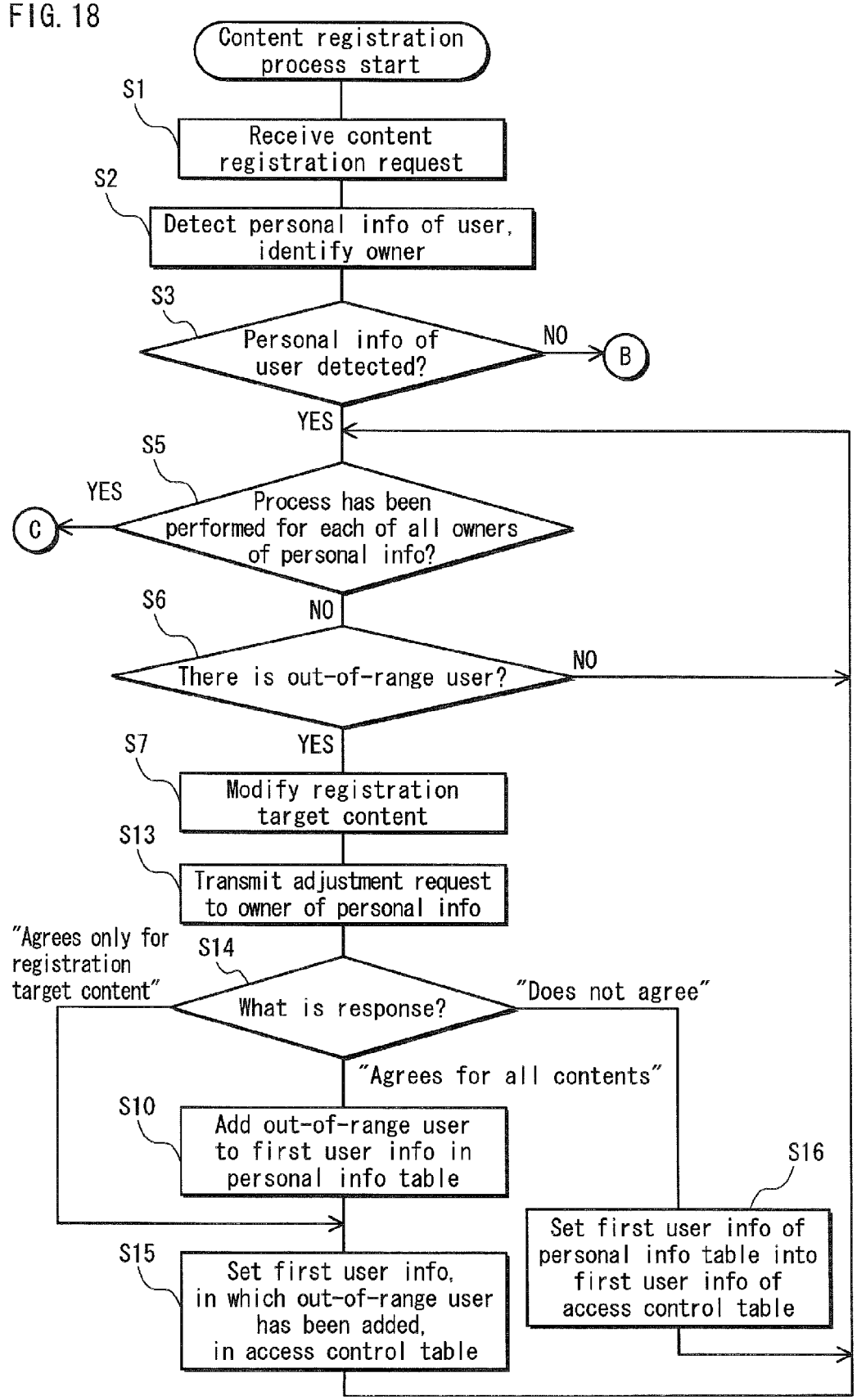
FIG. 18 is a flowchart showing the procedure of the content registration process in Embodiment 2, continuing to FIG. 19.
Figure 19:
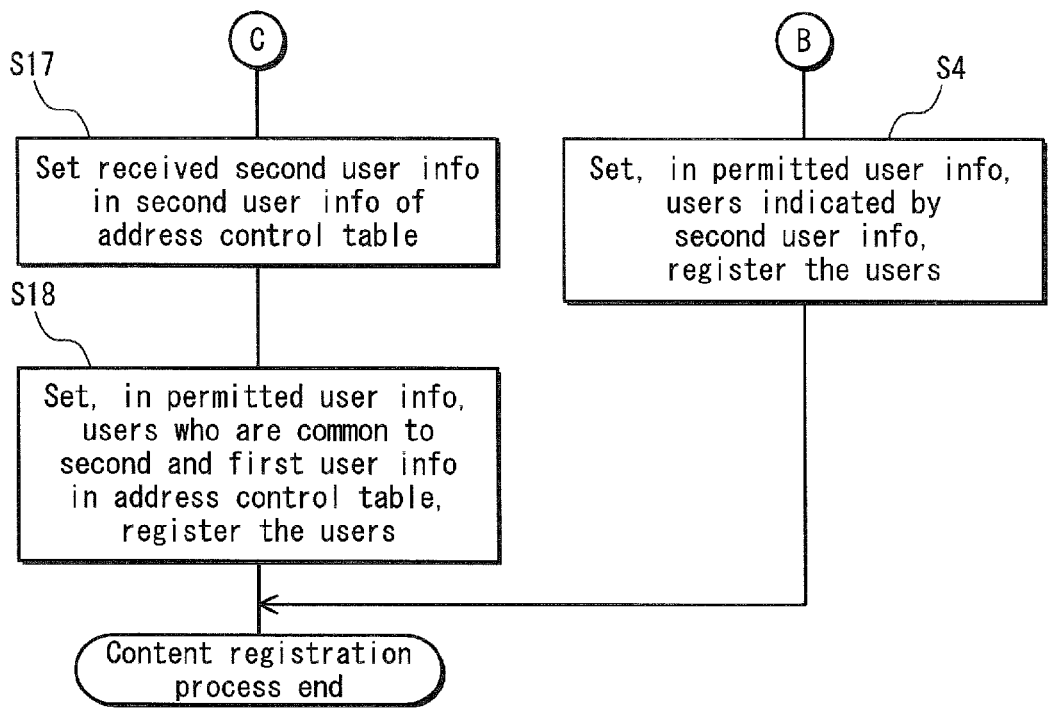
FIG. 19 is a flowchart showing the procedure of the content registration process in Embodiment 2, continued from FIG. 18.

FIGS. 18 and 19 are flowcharts showing the procedure of the content registration process performed by the access control device 150.

Among the content registration process performed by the access control device 150, the process performed in steps Si to S7 is the same as the process performed in steps S1 to S7 in the content registration process by the access control device 100 in Embodiment 1 (see FIG. 4).

Accordingly, the following describes the process performed in step S13 and after.

The adjustment unit 152 of the control unit 151 transmits an adjustment request including the registration target content modified by the content modifying unit 133 to the target user (step S13 shown in FIG. 18).

Here, the adjustment request is generated and transmitted in the same manner as in Embodiment 1, but the email has, for example, a body of the message as shown in FIG. 22A.

Upon receiving this adjustment request, the adjustment request processing unit 252 of the control unit 250 in a terminal device (200A, 200B, or 200C) used by the target user transmits a response to the adjustment request, to the access control device 150 via the communication unit 210, based on an input from the input unit 230.

In this example, it is presumed that, as a response indicating that the user agrees with permitting the out-of-range user to access each of all contents that include personal information of the user himself/herself, an email that includes "1" in the body of the message is transmitted, as in Embodiment 1 (see FIG. 10B).

Also, in this example, it is presumed that, as a response indicating that the user agrees with permitting the out-of-range user to access only the registration target content, an email that includes a registration target content ID (indicated by "M9") in the "Subject" field, and includes "2" (indicated by "M10") in the body of the message is transmitted, as shown in FIG. 22B.

Furthermore, in this example, it is presumed that, as a response indicating that the user does not agree with permitting the out-of-range user to access a content, an email that includes "0" in the body of the message is transmitted, as in Embodiment 1 (see FIG. 10C).

The adjustment unit 152 determines the type of a response received in response to a transmitted adjustment request (step S14).

More specifically, in this example, if an email, which includes a registration target content ID in the "Subject" field, and includes "1" in the body of the message, has been received from the address of the adjustment request transmitted in step S13, it is judged that a response, which agrees with permitting the out-of-range user to access all the contents, has been received (step S14: "Agrees for all contents").

In that case, the personal information table updating unit 136 adds a user ID of the out-of-range user into a piece of first user information associated with the user ID of the target user in the personal information table 10 (step S10).

Also, the content managing unit 153 of the control unit 151 registers, in the access control table 70, (i) a piece of personal information owner information in which the user ID of the target user has been set, and (ii) a piece of first user information in which the user ID of the out-of-range user has been added, in association with the registration target content ID (step S15), and the judgment unit 132 performs the process again from step S5.

If it is judged in step S14 that an email, which includes a registration target content ID in the "Subject" field, and includes "2" in the body of the message, has been received from the address of the adjustment request transmitted in step S13, it is judged that a response, which agrees with permitting the out-of-range user to access only the registration target content, has been received (step S14: "Agrees only for registration target content").

In that case, the content managing unit 153 obtains a piece of first user information that is associated with the user ID of the target user in the personal information table 10. Also, the content managing unit 153 registers, in the access control table 70, (i) a piece of personal information owner information in which the user ID of the target user has been set, and (ii) a piece of first user information which is the obtained first user information added with the user ID of the out-of-range user, in association with the registration target content ID (step S15), and the judgment unit 132 performs the process again from step S5.

If it is judged in step S14 that an email, which includes a registration target content ID in the "Subject" field, and includes "0" in the body of the message, has been received from the address of the adjustment request transmitted in step S13, it is judged that a response, which does not agree with permitting the out-of-range user to access any content, has been received (step S14: "Does not agree").

In that case, the content managing unit 153 obtains a piece of first user information that is associated with the user ID of the target user in the personal information table 10. Also, the content managing unit 153 of the control unit 151 registers, in the access control table 70, (i) a piece of personal information owner information in which the user ID of the target user has been set, and (ii) the obtained first user information, in association with the registration target content ID (step S16), and the judgment unit 132 performs the process again from step S5.

If it is judged that the process with respect to each owner of all the identified pieces of personal information has been performed (step S5: YES), the content managing unit 153 stores the registration target content ID and the registration target content in association with each other in the storage unit 120. Also, the content managing unit 153 obtains one or more pieces of first user information and a piece of second user information that are associated with the registration target content ID in the access control table 70, and registers permitted user information, which is composed of one or more user IDs having been identified in the same manner as in step S11 shown in FIG. 4, in the address control table 70 in association with the registration target content ID (step S18), and the access control device 150 ends the content registration process.

<First User Information Update Process>

Figure 20:
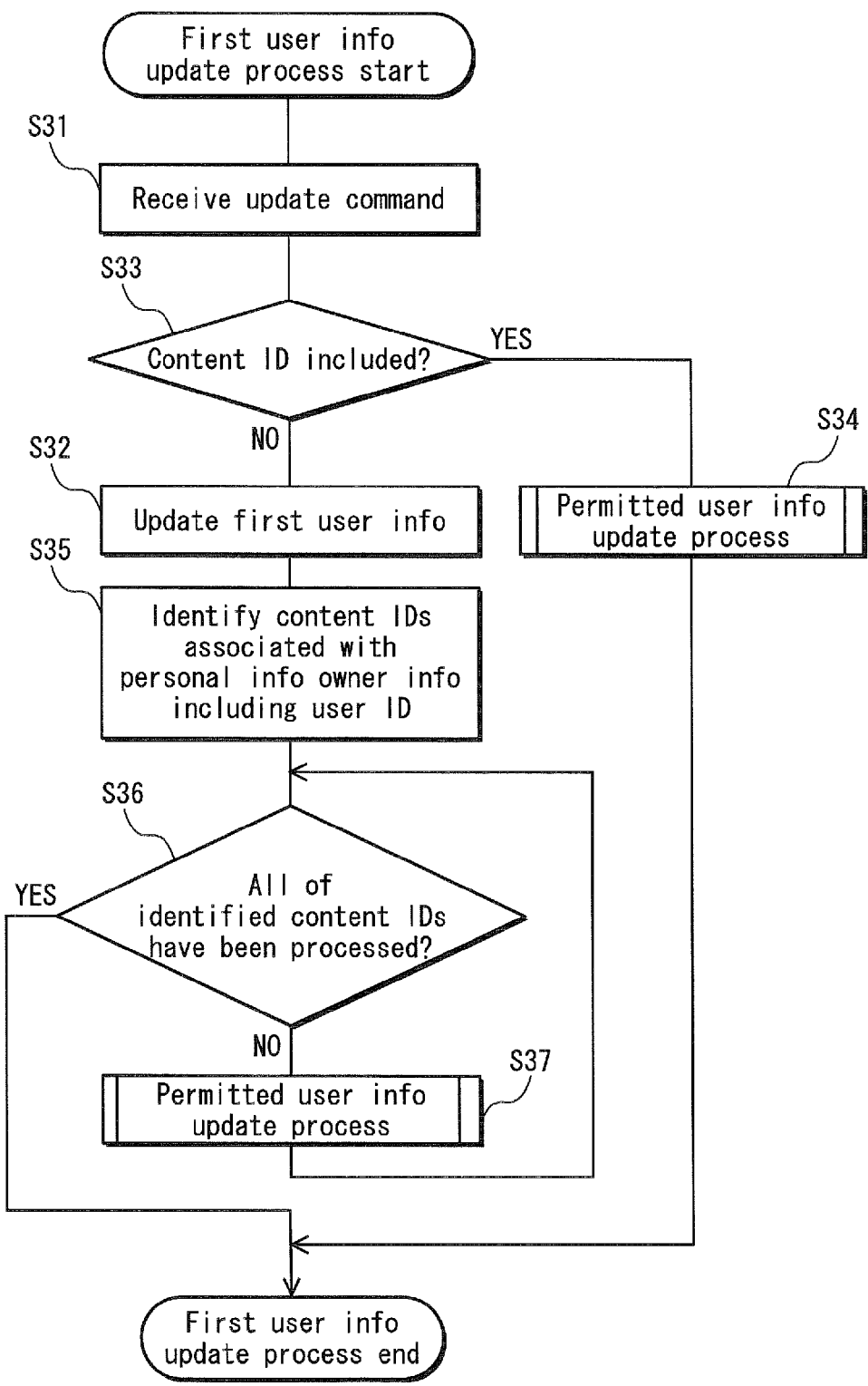
FIG. 20 is a flowchart showing the procedure of the first user information update process in Embodiment 2.

FIG. 20 is a flowchart showing the procedure of the first user information update process performed by the access control device 150.

Among the first user information update process performed by the access control device 150, the process performed in steps S31 and S32 is the same as the process performed by the access control device 100 in Embodiment 1 in steps S31 and S32 (see FIG. 6).

Accordingly, the following description centers on the process performed in the steps other than steps S31 and S32.

If the control unit 151 of the access control device 150 receives a first user information update request from a terminal device (200A, 200B or 200C) via the communication unit 110 (step S31), the personal information table updating unit 154 of the control unit 151 judges whether a content ID is included in the received first user information update request (step S33).

If it is judged that a content ID is included (step S33: YES), the content managing unit 153 of the control unit 151 performs the permitted user information update process by using this content ID as the update target content ID (step S34). The permitted user information update process will be described below (see FIG. 21).

Upon completion of the permitted user information update process, the access control device 150 ends the first user information update process.

On the other hand, if it is judged that a content ID is not included in the received first user information update request (step S33: NO), the personal information table updating unit 154 updates a piece of first user information associated, in the personal information table 10, with a user ID included in the received first user information update request, by replacing the piece of first user information with a piece of first user information included in the received first user information update request (step S32).

Also, the content managing unit 153 identifies all content IDs that are associated, in the access control table 70, with personal information owner information that matches the user ID included in the received first user information update request (step S35).

The content managing unit 153 judges whether or not the process of step S37, which will be described below, has been performed with regard to all of the one or more identified content IDs (step S36). If it judges that the process has not been performed with regard to all of the one or more identified content IDs (step S36: NO), the content managing unit 153 performs the permitted user information update process on an update target content ID, which is one of the one or more identified content IDs on which the process has not been performed (step S37).

Upon completion of the permitted user information update process, the content managing unit 153 performs the process again from step S36.

Also, if it judges that the process has been performed with regard to all of the one or more identified content IDs (step S36: YES), the access control device 150 ends the first user information update process.

<Permitted User Information Update Process>

The following explains the permitted user information update process to be performed in steps S34 and S37.

Figure 21:
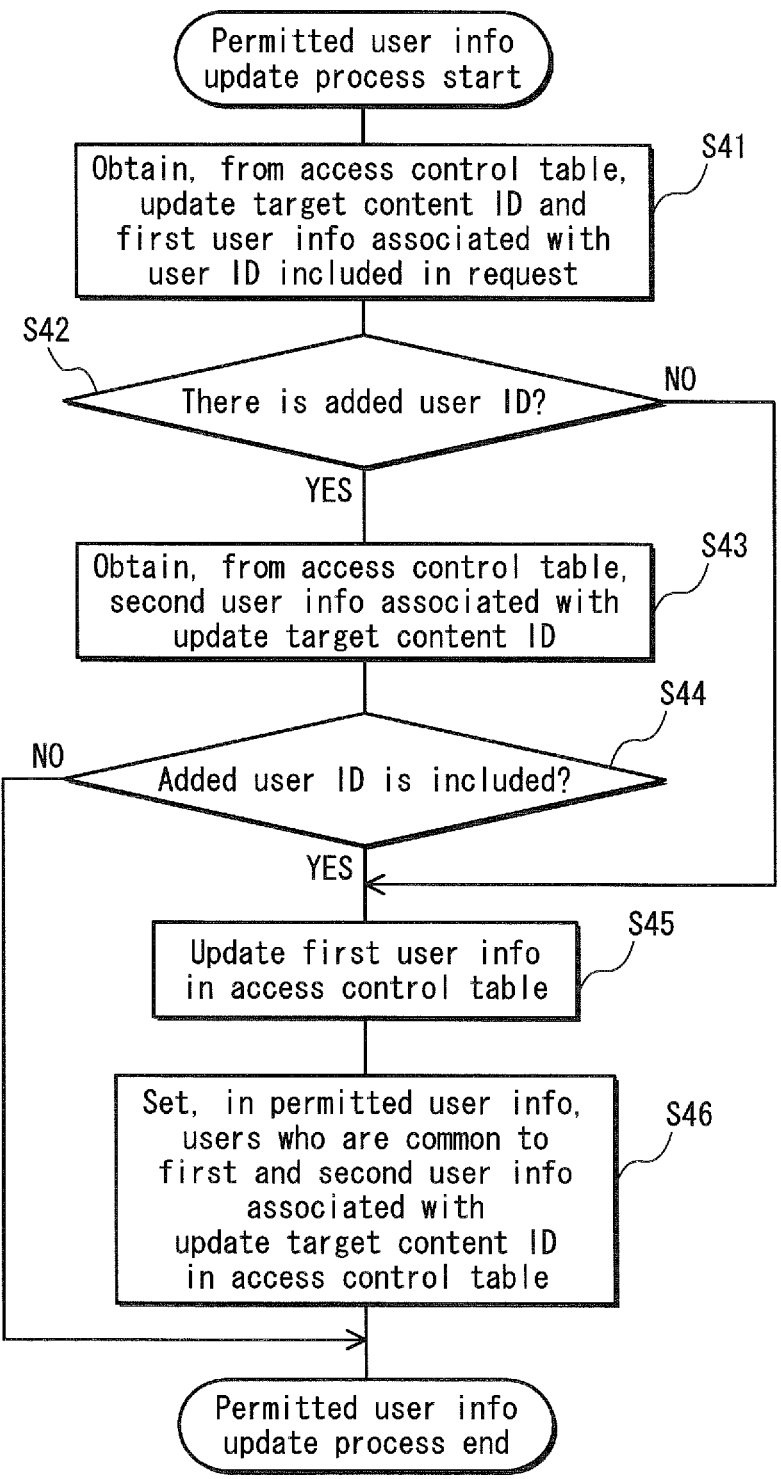
FIG. 21 is a flowchart showing the procedure of the permitted user information update process in Embodiment 2.

FIG. 21 is a flowchart showing the procedure of the permitted user information update process performed by the access control device 150.

The content managing unit 153 obtains a piece of first user information associated, in the access control table 70, with the update target content ID and the user ID included in the received first user information update request (step S41).

The content managing unit 153 identifies one or more added user IDs by comparing the obtained first user information with the first user information included in the received first user information update request.

It should be noted here that the added user ID is a user ID that is not included in the obtained first user information, but is included in the first user information included in the received first user information update request.

The content managing unit 153 judges whether or not there is an added user ID (step S42). If it judges that there is no added user ID (step S42: NO), the control proceeds to the process of step S45 which will be described below.

Also, if it judges that there is an added user ID (step S42: YES), the content managing unit 153 obtains a piece of second user information associated with the update target content ID in the access control table 70 (step S43).

The content managing unit 153 judges whether or not the added user ID is included in the obtained second user information (step S44). If it is judged that the added user ID is not included in the obtained second user information (step S44: NO), the access control device 150 ends the permitted user information update process.

If it is judged that the added user ID is included in the obtained second user information (step S44: YES), the content managing unit 153 updates a piece of first user information, which is associated, in the access control table 70, with the update target content ID and the user ID contained in the received first user information update request, with a piece of first user information contained in the received first user information update request (step S45).

The content managing unit 153 obtains one or more pieces of first user information associated with the update target content ID in the access control table 70, and updates a piece of permitted user information associated with the update target content ID in the access control table 70, to include one or more user IDs that are commonly included in the obtained first user information and the second user information obtained in step S43 (step S46).

<Supplementary Notes>

Up to now, the access control device of the present invention has been described based on Embodiments 1, 2 and Modification (hereinafter they may be referred merely as "Embodiments"). However, the present invention is not limited to the access control device described above in the Embodiments, but may be modified, for example, as follows.

(1) In the Embodiments, information regarding the user who requested a content registration request (namely, the owner of the content) is not included in the data items of the access control table. However, not limited to this, the user ID of this user (hereinafter referred to as "content owner information") may be registered.

This content owner information may be used to modify the access control process described in the Embodiments (FIGS. 5 and 14-15) such that, for example, an access target content is transmitted if a user ID included in the content access request is included in the content owner information, even if the user ID is not included in the permitted user information associated with the content.

(2) In the Modification, upon receiving a request to access a registered content for the first time, an adjustment request is made as necessary (see steps S50-S52, S7 and S8 shown in FIG. 14).

However, this may be modified such that, for example, the process of step S50 and after is performed only when a user ID included in a received content access request is included in a piece of second user information associated, in the access control table 60, with a content ID included in the received content access request.

(3) The process of steps S8-S10 in the process for controlling accesses to contents performed by the modified access control device in the Modification (see FIG. 14) may be replaced with the process of steps S13, S14, S10, S15 and S16 in the content registration process performed by the access control device 150 in Embodiment 2 (see FIG. 18). Also, the first user information update process performed by the modified access control device (see FIG. 6) may be replaced with the first user information update process performed by the access control device 150 in Embodiment 2 (see FIGS. 20 and 21).

In that case, the access control table 70 needs to be used instead of the access control table 60.

With this modification, each user can flexibly select whether or not to agree with permitting one or more out-of-range users to access a content, for each content that includes personal information of the user himself/herself, and can change the selection later.

(4) In the Embodiments, a modified registration target content is attached to an adjustment request (email). However, the modified registration target content may not be attached thereto. It is preferable however that a modified registration target content is attached to an adjustment request (email).

This is because it is generally difficult for a user who received the adjustment request, to judge whether or not to agree with permitting the out-of-range user to access a content, if he/she cannot identifying the content. That is to say, if a modified registration target content has not been attached to an adjustment request received by a user, it would be highly possible that the user does not agree with permitting an out-of-range user to access a content. Accordingly, in order to promote a sharing of a content by access control devices in the Embodiments, it is preferable that a modified registration target content is attached to an adjustment request (email).

(5) In the Embodiments, a modified access target content is transmitted if a user ID included in a content access request is included in personal information owner information, even if the user ID is not included in permitted user information associated with the content (see steps S25-S27 shown in FIGS. 5 and 15).

However, if it is judged that the user ID contained in the access request is not contained in the permitted user information for the content (step S23: NO), a message may be transmitted to the terminal device which is the transmission source of the content access request, the message indicating that the requester does not have an access right (step S28).

(6) In the Embodiments, a registration of a new record and a deletion of a record in/from the personal information table 10 are performed by the manager of the access control device in the Embodiments. However, a user registration request and a user deletion request may be added as commands that are transmitted from each terminal device to the access control device in the Embodiments so that a person who desires a user registration or deletion can perform it by himself/herself.

Here, the user registration request includes a user name of the requester, facial image data, an email address, and the first user information, among the data items set in each record in the personal information table 10.

Upon receiving the user registration request, the modified access control device of the modification (6) extracts a group of image characteristics parameters (facial data) from the facial image data included in the received user registration request, generates a new user ID, and adds a record into the personal information table 10, wherein the added record is composed of the generated user ID, the extracted facial data, and the user name, email address and first user information included in the received user registration request. After adding the record, the modified access control device notifies the email address included in the added record of the generated user ID.

The user deletion request includes a user ID of the requester. Upon receiving a user deletion request, the modified access control device deletes the user ID, which is included in the user deletion request, from the permitted user information of the access control table in the Embodiments.

In that case, a record including the user ID, which is included in the received user deletion request, may be deleted from the personal information table 10. Also, the user ID, which is included in the received user deletion request, may be deleted from an associated piece of personal information owner information in the access control table of the Embodiments. In that case, especially in the access control device 150 of Embodiment 2, a piece of first user information associated with the piece of personal information owner information may be deleted from the access control table 70.

Furthermore, in the access control devices of the Modification and Embodiment 2, when the user ID, which is included in the received user deletion request, is deleted from an associated piece of personal information owner information in the access control table (60, 70), the permitted user information may be set again.

(7) In the Embodiments, the access control device detects personal information of users of the access control system in the Embodiments (step S2 shown in FIGS. 4, 13 and 18). However, for example, templates of general facial images or dictionary data of people's names may be stored in advance, and personal information of a person other than the users may be detected based on such stored data.

Furthermore, the detection results may be used so that, for example, the mosaic processing or the turned-letter process can be performed on the personal information of a person other than the users when a registration target content or an access target content is modified.

(8) In the Modification, in the content registration process, personal information of users is detected in advance (see step S2 shown in FIG. 13). However, not limited to this, personal information of users may be detected in the process for controlling accesses to registered contents.

More specifically, for example, the process of steps S2-S4 and S12 shown in FIG. 13 may be performed between steps S50 and S51 shown in FIG. 14.

(9) In the Embodiments, examples of registration target content include image data, video data, and text data. However, not limited to these, a registration target content may be, for example, audio data.

In that case, for example, it is possible to detect personal information of each user included in this registration target content (audio data) by subjecting the registration target content to an audio recognition process, extracting text data associated with a voice/sound included in the registration target content, and matching the extracted text data to each user ID, each user name and each email address registered in the personal information table 10.

Also, voice data of each user may be registered in the personal information table 10 so that a voice (personal information) of each user can be detected by matching the registration target content to the registered voice data.

Note that the detection of personal information included in the registration target content (audio data) may be modified so that it can be applied to audio data included in video data as well.

Also, when the access target content is audio data, the received content processing unit 253 of the control unit 250 in each terminal device will be configured to output a voice/sound to the speaker of the output unit 240.

(10) In the Embodiments, the content modifying unit 133 performs the mosaic processing or the turned-letter process as one example of a method of modifying a registration target content or access target content. However, not limited to these, any process may be performed as long as the process modifies the content so that users other than a particular user cannot be identified from personal information of the other users.

For example, data (image data or text data) portions including personal information of the other users may be deleted, or a process in which image portions including personal information of the other users are blacked out may be performed, or a process in which image portions including personal information of the other users are overlaid with images of a predetermined pattern (for example, images of tiles) (overlay process) may be performed.

(11) In the Embodiments, the content ID is used to identify each registered content. However, this is merely an example, and other information that can identify each registered content may be used. For example, path information or URL (Uniform Resource Locator) indicating a content storage location may be used.

(12) Although not described specifically in the Embodiments, the present invention may be structured so that a registered content can be deleted by an owner of the content and an owner of personal information included in the content.

For this purpose, a content deletion request may be added as a command that can be transmitted from the terminal devices to the access control device of the Embodiments.

Here, the content deletion request is, for example, a command that is generated by changing the type 41 of the content access request 40 shown in FIG. 3B to "deletion".

If an access control device of this modification receives this content deletion request and a user ID included in the received content deletion request indicates an owner of a content specified in this request or an owner of personal information included in the content, the access control device deletes a content stored in association with a content ID of the specified content in the storage unit 120, and deletes a record including that content ID from the access control table of the Embodiments.

Note that, when this deletion is performed, each user indicated by permitted user information included in this record may be notified that the content is deleted.

Also, since the data items of the access control table in the Embodiments do not include content owner information, in order to realize this modification, the data structure of the access control table in the Embodiments needs to be modified to include the content owner information.

Note that, although in this modification, a registered content can be deleted by an owner of the content and an owner of personal information included in the content, this modification may further be modified so that a registered content can be deleted only by an owner of the content or only by an owner of personal information included in the content.

(13) In the implementation of the permitted user information update process described in Embodiment 2, there may be a case where permitted user information does not include a user ID.

In that case, as is the case where the above content deletion request is received, an associated content and an associated record in the access control table may be deleted.

Note that, when this deletion is performed, the owner of the content may be notified that the content is deleted.

(14) In the Embodiments, each of the first user information, second user information, permitted user information, and personal information owner information includes one or more user IDs. However, when any of these information includes only a piece of particular data (for example, "U0000"), all users of the access control system in the Embodiments may be indicated.

With this structure, it becomes easy to specify, in each of the above information, all users of the access control system in the Embodiments.

(15) In the Embodiments, the adjustment requests and the responses are transmitted and received via email. However, this is merely an example. Accordingly, not only a general purpose program such as a mailer, but also various communication mediums or transmission/reception protocols, such as a dedicated message transmission/reception application for transmitting and receiving messages, may be used.

Also, in the Embodiments, an adjustment request is made whenever there is an out-of-range user. However, the permitted user information may be determined based on the second user information and the first user information registered in the personal information table 10 in association with owners of personal information included in the content, without making an adjustment request. With this structure, it is possible to reduce the time required to register a content after receiving a content registration request from a terminal device.

Furthermore, in the Embodiments, a process of transmitting an adjustment request (step S8 shown in FIGS. 4 and 14, step S13 shown in FIG. 18) and a process according to the contents of a response (steps S9 and S10 shown in FIGS. 4 and 14, steps S14, S10, S15 and S16 shown in FIG. 18) are performed sequentially with regard to the owners of personal information included in the registration target content.

However, adjustment requests may be transmitted sequentially to the owners of personal information included in the registration target content, and then each time a response to any of the transmitted adjustment requests is received, the above process according to the contents of the response may be performed. Then after the above process according to the contents of the response is completed for each of all owners of personal information included in the registration target content, the process of registering permitted user information may be performed (step S11 shown in FIG. 4, step S54 shown in FIG. 14, and steps S17 and S18 shown in FIG. 19).

(16) In the Embodiments, the terminal devices (200A, 200B and 200C) are personal computers (that have displays) used by respective users of the access control system 1000. However, the terminal devices may be various devices having a function to display on a display, the various devices including a battery-driven mobile display terminal and a high-resolution information display device, the mobile display terminal being, for example, a mobile telephone, a mobile music player, a digital camera, or a digital video camera, and the information display device being, for example, a television, a digital video recorder, or a car navigation. Also, the display is not limited to a Liquid Crystal Display (LCD), but may be a Cathode Ray Tube (CRT), a PDP (Plasma Display Panel), a flat display such as an organic EL, or a projection type display such as a projector.

(17) Each access control device described in the Embodiments is typically realized as an LSI (Large Scale Integration) that is a semiconductor integrated circuit. An LSI may be manufactured by integrating an access control device on one chip, or an LSI may be manufactured by integrating part or all of components constituting an access control device on one chip. Although the term "LSI" is used here, it may be called IC, system LSI, super LSI, ultra LSI or the like, depending on the level of integration.

Also, the method for realizing an integrated circuit is not limited to the LSI. The integrated circuit may be realized by, for example, a dedicated circuit or a general purpose processor. It is also possible to use the FPGA (Field Programmable Gate Array), with which a programming is available after the LSI is manufactured, or the reconfigurable processor that can re-configure the connection or setting of the circuit cells within the LSI.

Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

(18) A program for causing a CPU (Central Processing Unit) to execute the processes (see FIGS. 4-6, FIGS. 13-15, and FIGS. 18-21) of the access control device described in the Embodiments may be recorded on a recording medium and distributed via the recording medium, or may be distributed via any of various communication paths.

The recording mediums for the above purpose include an IC (Integrated Circuit) card, an optical disc, a flexible disk, a ROM (Read Only Memory), a flash memory, and a hard disk.

A distributed program is stored in a memory or the like that can be read by a CPU of the device, and when the CPU executes the program, the functions of the access control device described in the Embodiments are realized.

(19) Part or all of the above modifications (1) to (18) may be combined and applied to the access control device of the Embodiments.

(20) The following further describes the structure, modification, and effects of the access control device in one embodiment of the present invention.

(a) The access control device in one embodiment of the present invention is an access control device for use in a system for providing users with a content access service, the access control device comprising: an obtaining unit operable to obtain a content including one or more pieces of personal information; a storage unit storing a plurality of pieces of personal information in correspondence with a plurality of pieces of first user information each of which indicates one of (i) a user who is permitted by a person related to a corresponding piece of personal information to access a content including the corresponding piece of personal information, and (ii) a user who is not permitted by the person related to the corresponding piece of personal information to access the content; and a control unit operable to determine whether or not to give permission to access the content obtained by the obtaining unit, in accordance with a piece of first user information stored in the storage unit in correspondence with the piece of personal information included in the content.

Here, the term "content" means information such as image data, video data, audio data, or text data.

Also, "personal information" means information related to a person, including, for example, information which is used alone by itself for identifying the person, and information which is used for identifying the person in combination with other information that can be easily obtained.

The information which is used alone by itself for identifying a person may be, for example: (A) facial image data of the person included in captured image data or video data; (B) vocal data of the person included in video data or audio data; (C) image data which, included in image data or video data, represents a name, address, or birth date of the person; or (D) text data which, included in text data, represents a name, address, or birth date of the person. The information which is used for identifying a person in combination with other information may be a user ID, for example.

The access control device in one embodiment of the present invention with the above structure determines whether or not to give permission to access a content, based on the first user information which indicates one of (i) a user who is permitted by a person (owner of personal information) related to a corresponding piece of personal information to access the content including the corresponding piece of personal information, and (ii) a user who is not permitted by the person (owner of personal information) related to the corresponding piece of personal information to access the content. Therefore, according to this access control device, it is possible to perform a control on whether or not to permit an access to a content, reflecting intention of owners of personal information included in the content.

(b) In the above access control device, the content obtained by the obtaining unit may have been transmitted from an external transmitter, and the obtaining unit obtains a piece of second user information which indicates one of (i) a user who is desired by the transmitter to be permitted to access the content, and (ii) a user who is desired by the transmitter not to be permitted to access the content, and the control unit determines whether or not to give permission to access the content in accordance with the piece of second user information obtained by the obtaining unit, as well as the piece of first user information.

The above access control device determines whether or not to give permission to access a content, based on the second user information which indicates one of (i) a user who is desired by the transmitter (owner of the content) to be permitted to access the content, and (ii) a user who is desired by the transmitter (owner of the content) not to be permitted to access the content. Therefore, according to this access control device, it is possible to perform a control on whether or not to permit an access to a content, reflecting intention of the owner of the obtained content.

(c) In the above access control device, each piece of first user information may be a set of identification information of one or more users who are permitted by persons related to corresponding pieces of personal information to access contents including the corresponding pieces of personal information, each piece of second user information is a set of identification information of one or more users who are desired, by transmitters of contents obtained by the obtaining unit, to be permitted to access the contents, and when all users indicated by the piece of second user information are included among users indicated by the piece of first user information, the control unit gives permission to the users indicated by the piece of second user information to access the content obtained by the obtaining unit.

According to this access control device, it is possible to give permission to access a content to a range of users who are acknowledged by both the owner of the obtained content and the owners of personal information included in the content.

(d) In the above access control device, persons related to the personal information stored in the storage unit may be users of the access control device, and if there is an out-of-range user who is included in the one or more users indicated by the piece of second user information, but is not included in the one or more users indicated by the piece of first user information, the control unit requests a user, who is related to personal information stored in correspondence with the piece of first user information, to return a response indicating whether or not to permit the out-of-range user to access, and upon receiving a response indicating to permit the out-of-range user to access, gives permission to the users indicated by the piece of second user information to access the content obtained by the obtaining unit.

According to this access control device, even if there is an out-of-range user, if the owners of personal information included in the content agree with permitting the out-of-range user to access the content, it is possible to give permission to access the content to users who are desired by the owner of the content to be permitted to access the content.

Therefore, according to this access control device, it is possible to determine users who are permitted to access a content, by directly reflecting intention of the owner of the content, while respecting intention of the owners of personal information included in the content.

(e) In the above access control device, if the control unit receives the response indicating to permit the out-of-range user to access, from the user who is related to personal information stored in correspondence with the piece of first user information, the control unit may update the piece of first user information to include the out-of-range user in the one or more users indicated by the piece of first user information.

With this structure, if an owner of personal information included in a content agrees with permitting, for example, an out-of-range user A to access the content, the access control device updates the first user information corresponding to the personal information to include the out-of-range user A.

Therefore, according to this access control device, with respect to other contents which include the personal information of the owner of the personal information, there is no need to request him/her to return responses indicating if he/she permits the out-of-range user A to access the contents. Thus it is possible to reduce the processing load on this access control device, and save the owners of the personal information the trouble of responding again.

(f) In the above access control device, if the control unit receives the response indicating not to permit the out-of-range user to access, from the user who is related to personal information stored in correspondence with the piece of first user information, the control unit may give permission to the users indicated by the piece of second user information, except for the out-of-range user, to access the content obtained by the obtaining unit.

According to this access control device, it is possible to appropriately prevent a permission to access a content from being given to one or more users whom the one or more owners of the personal information do not intend to give permission, while reflecting intention of the owner of the content to some extent.

(g) In the above access control device, persons related to the personal information stored in the storage unit may be users of the access control device, and if the control unit receives, from a user, an update request to update a piece of first user information stored in correspondence with personal information of the user, the control unit updates the piece of first user information.

According to this access control device, each user can, flexibly depending on the circumstances of the moment, change one or more users whom the user permits to access a newly obtained content that includes the personal information of the user.

(h) In the above access control device, the control unit may further manage a piece of permitted user information and a piece of second user information in correspondence with each other for each content obtained by the obtaining unit, the piece of permitted user information indicating users who are permitted to access a corresponding content, the piece of second user information corresponding to the content, and when updating the piece of first user information, the control unit updates a piece of permitted user information related to a content including personal information of a user who transmitted the update request to update the piece of first user information based on (i) information indicating the piece of first user information after update and (ii) a piece of second user information related to the content.

(i) In the above access control device, persons related to the personal information stored in the storage unit may be users of the access control device, the control unit further manages a piece of permitted user information and a piece of second user information in correspondence with each other for each content obtained by the obtaining unit, the piece of permitted user information indicating one or more users who are permitted to access a corresponding content, the piece of second user information corresponding to the content, and if the control unit receives, from a user, information indicating one or more users whom the user has given permission to access a content including personal information of the user, the control unit updates a piece of permitted user information related to the content based on (i) the received information and (ii) a piece of second user information related to the content.

That is to say, according to this access control device, each user can, flexibly depending on the circumstances, change users whom the user permits to access a content that includes the personal information of the user.

(j) In the above access control device, if the content obtained by the obtaining unit includes a plurality of pieces of personal information, the control unit may judge, for each of the plurality of pieces of personal information, whether or not there is an out-of-range user who is not included among one or more users indicated by a piece of first user information stored in correspondence with a piece of personal information, but is included among one or more users indicated by the piece of second user information, and if the control unit judges that there is an out-of-range user, the control unit requests a user who is related to the piece of personal information, to return a response indicating whether or not to permit the out-of-range user to access, and upon receiving, from all users, a response indicating to permit the out-of-range user to access, the control unit gives permission to the users indicated by the piece of second user information to access the content obtained by the obtaining unit, and upon receiving, from any user, a response indicating not to permit the out-of-range user to access, the control unit gives permission to the users indicated by the piece of second user information, except for the out-of-range user, to access the content obtained by the obtaining unit.

According to this access control device, only if all owners of personal information included in a content agree with permitting an out-of-range user (an out-of-range user for the owners of personal information) to access the content, each user, whom the owner of the content desires to give permission to access the content, is given permission to access the content.

Therefore, according to this access control device, it is possible to give permission to access a content to a range of users whom all owners of personal information included in the content intend to give permission, while respecting intention of all owners of the personal information.

(k) In the above access control device, when the control unit requests each of users, who are related to the piece of personal information included in the content obtained by the obtaining unit, to return the response, the control unit may modify the content so that persons other than a user who made an access request cannot be identified from personal information of the persons, and present a modified content to the user who made the access request.

According to this access control device, it is possible for an owner of personal information included in a content to check the personal information of the owner himself/herself before determining whether or not to permit an out-of-range user to access the content.

Also, according to this access control device, even if a plurality of pieces of personal information of different owners are included in a content, the content is modified so that one or more owners other than a target owner cannot be identified from one or more pieces of personal information of the one or more other owners, and then the content is presented to the target owner. Therefore, according to this access control device, it is possible to prevent the content from being presented to a user whom the one or more other owners do not intend to give permission to access the content.

(l) In the above access control device, persons related to the personal information stored in the storage unit may be users of the access control device, and the control unit further manages permitted user information indicating, for each content obtained by the obtaining unit, users who are permitted to access contents, and permits other users, who are other than users indicated by a piece of permitted user information as being permitted to access a content obtained by the obtaining unit and who are related to personal information included in the obtained content, to access a modified content that has been modified so that one or more persons other than a user who made an access request cannot be identified from personal information of the one or more persons.

According to this access control device, even if an owner of personal information included in a content is not included in one or more users who are permitted by the owner of the content to access the content, the owner of the personal information can check the personal information included in the content.

Also, according to this access control device, even if a plurality of pieces of personal information of different owners are included in a content, the content is modified so that one or more owners other than a target owner cannot be identified from one or more pieces of personal information of the one or more other owners, and then an access to the content is permitted. Therefore, according to this access control device, it is possible to prevent a permission to access the content is given to a user whom the one or more other owners do not intend to give permission to access the content.

(21) The obtaining unit, storage unit, and control unit in the access control device of the present invention correspond to, for example, the communication unit 110, the storage unit 120, and the control unit, respectively.

[Industrial Applicability]

The present invention can be used to control accesses to contents such as image data.

REFERENCE SIGNS LIST

100, 150 access control device
110, 210 communication unit
120 storage unit
130, 151, 250 control unit
131 personal information detecting unit
132 judgment unit
133 content modifying unit
134, 152 adjustment unit
135, 153 content managing unit
136, 154 personal information table updating unit
137 access request processing unit
200 terminal device
220 content storage unit
230 input unit
240 output unit
251 request transmission processing unit
252 adjustment request processing unit
253 received content processing unit
300 Internet
1000, 1100 access control system

The invention claimed is:

1. An access control device for controlling accesses by users to image contents each including still image data or video image data, the access control device comprising:
   a storage circuit storing first user information in association with each of one or more persons, each piece of the first user information being a set of identification information of one or more users who are permitted by a person to access image contents including image data in which the person is a subject;
   an obtaining circuit obtaining an image content together with a piece of second user information, both having been transmitted from an external transmitter, the image content including image data in which one or more persons are subjects, and the piece of the second user information being a set of identification information of one or more users who are desired by the transmitter to be permitted to access the image content; and
   a control circuit (i) extracting, from the first user information, one or more pieces of identification information of one or more users who are permitted by all of the one or more persons, who are the subjects of the image data included in the image content obtained by the obtaining circuit, to access the image content and (ii) permitting a user to access the image content when the user is included among the one or more users indicated by the piece of the second user information and is included among the one or more users indicated by the one or more pieces of identification information extracted by the control circuit.

2. The access control device of claim 1, wherein
   the persons are users of the access control device, and
   if there is an out-of-range user who is included in the users indicated by the piece of the second user information, but is not included in the users indicated by one or more pieces of the first user information, the control circuit requests each of users, who have set the one or more pieces of the first user information, to return a response indicating whether or not to permit the out-of-range user to access, and upon receiving a response indicating to permit the out-of-range user to access, gives permission to each user indicated by the piece of the second user information to access the image content obtained by the obtaining circuit.

3. The access control device of claim 2, wherein, if the control circuit receives the response indicating to permit the out-of-range user to access, from the users who have set the one or more pieces of the first user information, the control circuit updates a piece of the first user information to include the out-of-range user in the users indicated by the piece of the first user information.

4. The access control device of claim 2, wherein, if the control circuit receives the response indicating not to permit the out-of-range user to access, from the users who have set the one or more pieces of the first user information, the control circuit gives permission to the users indicated by the piece of second user information, except for the out-of-range user, to access the image content obtained by the obtaining circuit.

5. The access control device of claim 1, wherein
   the persons are users of the access control device, and
   if the control circuit receives, from a user, an update request to update a piece of the first user information stored in the storage circuit in association with the user, the control circuit updates the piece of the first user information.

6. The access control device of claim 5, wherein
   the control circuit further manages a piece of permitted user information and a piece of the second user information in association with each other for each image content obtained by the obtaining circuit, the piece of the permitted user information indicating users who are permitted to access the image content, the piece of the second user information being related to the image content, and
   when updating the piece of the first user information, the control circuit updates a piece of the permitted user information related to an image content including image data in which the user who transmitted the update request is a subject, based on (i) information indicating the piece of the first user information after the update and (ii) a piece of the second user information related to the image content.

7. The access control device of claim 1, wherein
   the persons are users of the access control device,
   the control circuit further manages a piece of permitted user information and a piece of the second user information in association with each other for each image content obtained by the obtaining circuit, the piece of the permitted user information indicating users who are permitted to access the image content, the piece of the second user information being related to the image content, and if the control circuit receives, from a user, information indicating users whom the user has given permission to access an image content including image data in which the user is a subject, the control circuit updates a piece of the permitted user information related to the image content based on (i) the received information and (ii) a piece of the second user information related to the image content.

8. The access control device of claim 1, wherein if the image content obtained by the obtaining circuit includes a plurality of pieces of image data in which, on a one-to-one correspondence basis, a plurality of users are subjects, the control circuit judges, for each of the plurality of pieces of image data, whether or not there is an out-of-range user who is not included in one or more users indicated by the first user information stored in the storage circuit in association with a user who is a subject in the piece of image data, but is included in one or more users indicated by the piece of the second user information, and if the control circuit judges that there is the out-of-range user, the control circuit requests the user, who is the subject in the piece of image data, to return a response indicating whether or not to permit the out-of-range user to access, upon receiving, from all of the users requested to return the response, the response indicating to permit the out-of-range user to access, the control circuit gives permission to the users indicated by the piece of the second user information to access the image content obtained by the obtaining circuit, and upon receiving, from any of the users requested to return the response, the response indicating not to permit the out-of-range user to access, the control circuit gives permission to the users indicated by the piece of the second user information, except for the out-of-range user, to access the image content obtained by the obtaining circuit.

9. The access control device of claim 8, wherein, when the control circuit requests one or more users, who are subjects in image data included in the image content obtained by the obtaining circuit, to return the response, the control circuit modifies the image content so that persons other than a user who made an access request cannot be identified from other image data in which the persons are subjects, and presents a modified image content to the user who made the access request.

10. The access control device of claim 1, wherein
the persons are users of the access control device,
the control circuit further manages permitted user information for each image content obtained by the obtaining circuit, each piece of the permitted user information indicating users who are permitted to access an image content obtained by the obtaining circuit, and
if an image content obtained by the obtaining circuit includes image data including, as a subject, a user who is other than users indicated by a piece of the permitted user information associated with the image content, the control circuit modifies the image content so that persons other than the user cannot be identified from other image data in which the persons are subjects, and permits the user to access a modified image content.

11. An access control method for use in an access control device for controlling accesses by users to image contents each including still image data or video image data, the access control device including a storage circuit, an obtaining circuit and a control circuit, the access control method comprising the steps of:

storing, by the storage circuit, first user information in association with each of one or more persons, each piece of the first user information being a set of identification information of one or more users who are permitted by a person to access image contents including image data in which the person is a subject;

obtaining, by the obtaining circuit, an image content together with a piece of second user information, both having been transmitted from an external transmitter, the image content including image data in which one or more persons are subjects, and the piece of the second user information being a set of identification information of one or more users who are desired by the transmitter to be permitted to access the image content;

extracting, from the first user information, one or more pieces of identification information of one or more users who are permitted by all of the one or more persons, who are the subjects of the image data included in the image content obtained by said obtaining of the image content, to access the image content, said extracting being performed by the control circuit; and permitting, by the control circuit, a user to access the image content when the user is included among the one or more users indicated by the piece of the second user information and is included among the one or more users indicated by the one or more pieces of identification information extracted by said extracting of the one or more pieces of identification information.

12. A non-transitory computer-readable recording medium having a program recorded thereon, the program for causing a computer to perform an access control method, the computer being provided in an access control device for controlling accesses by users to image contents each including still image data or video image data, the access control method comprising the steps of:

storing first user information in association with each of one or more persons, each piece of the first user information being a set of identification information of one or more users who are permitted by a person to access image contents including image data in which the person is a subject;

obtaining an image content together with a piece of second user information, both having been transmitted from an external transmitter, the image content including image data in which one or more persons are subjects, and the piece of the second user information being a set of identification information of one or more users who are desired by the transmitter to be permitted to access the image content;

extracting, from the first user information, one or more pieces of identification information of one or more users who are permitted by all of the one or more persons, who are the subjects of the image data included in the image content obtained by said obtaining of the image content, to access the image content; and permitting a user to access the image content when the user is included among the one or more users indicated by the piece of the second user information and is included among the one or more users indicated by the one or more pieces of identification information extracted by said extracting of the one or more pieces of identification information.

13. An integrated circuit for use in an access control device for controlling accesses by users to image contents each including still image data or video image data, the integrated circuit comprising:

a storage circuit storing first user information in association with each of one or more persons, each piece of the first user information being a set of identification information of one or more users who are permitted by a person to access image contents including image data in which the person is a subject;

an obtaining circuit obtaining an image content together with a piece of second user information, both having been transmitted from an external transmitter, the image content including image data in which one or more persons are subjects, and the piece of the second user information being a set of identification information of one or more users who are desired by the transmitter to be permitted to access the image content; and a control circuit (i) extracting, from the first user information, one or more pieces of identification information of one or more users who are permitted by all of the one or more persons, who are the subjects of the image data included in the image content obtained by the obtaining circuit, to access the image content and (ii) permitting a user to access the image content when the user is included among the one or more users indicated by the piece of the second user information and is included among the one or more users indicated by the one or more pieces of identification information extracted by the control circuit.

* * * * *